US006253313B1

(12) United States Patent
Morrison et al.

(10) Patent No.: US 6,253,313 B1
(45) Date of Patent: *Jun. 26, 2001

(54) PARALLEL PROCESSOR SYSTEM FOR PROCESSING NATURAL CONCURRENCIES AND METHOD THEREFOR

(75) Inventors: Gordon Edward Morrison, Denver; Christopher Bancroft Brooks; Frederick George Gluck, both of Boulder, all of CO (US)

(73) Assignee: Biax Corporation, Palm Beach Gardens, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 08/480,691

(22) Filed: Jun. 7, 1995

Related U.S. Application Data

(62) Division of application No. 08/254,687, filed on Jun. 6, 1994, now Pat. No. 5,517,628, which is a division of application No. 08/093,794, filed on Jul. 19, 1993, now abandoned, which is a continuation of application No. 07/913,736, filed on Jul. 14, 1992, now abandoned, which is a continuation of application No. 07/560,093, filed on Jul. 30, 1990, now abandoned, which is a division of application No. 07/372,247, filed on Jun. 26, 1989, now Pat. No. 5,021,945, which is a division of application No. 06/794,221, filed on Oct. 31, 1985, now Pat. No. 4,847,755.

(51) Int. Cl.[7] .................................................. G06F 13/00
(52) U.S. Cl. .......................... 712/226; 712/228; 712/233; 712/234
(58) Field of Search ................................. 712/1, 11, 226, 712/228, 233, 234

(56) References Cited

U.S. PATENT DOCUMENTS

| | | | |
|---|---|---|---|
| 3,343,135 | * 9/1967 | Frelman et al. | 395/379 |
| 3,611,306 | * 10/1971 | Reigel et al. | 395/706 |
| 3,771,141 | * 11/1973 | Culler | 395/379 |
| 4,104,720 | * 8/1978 | Gruner | 395/598 |
| 4,109,311 | * 8/1978 | Blum et al. | 395/567 |
| 4,153,932 | * 5/1979 | Dennis et al. | 395/800.27 |
| 4,181,936 | * 1/1980 | Kober | 395/200.42 |
| 4,228,495 | * 10/1980 | Bernhard et al. | 364/136 |
| 4,229,790 | * 10/1980 | Gilliland et al. | 395/671 |
| 4,241,398 | * 12/1980 | Carll | 395/200.66 |
| 4,270,167 | * 5/1981 | Koehler et al. | 395/292 |
| 4,435,758 | * 3/1984 | Lorie et al. | 395/800.22 |
| 4,466,061 | * 8/1984 | Desantis et al. | 395/676 |
| 4,468,736 | * 8/1984 | Desantis et al. | 395/676 |

* cited by examiner

Primary Examiner—Meng-Al T. An
(74) Attorney, Agent, or Firm—Fish & Richardson P.C.

(57) ABSTRACT

A computer processing system containing a plurality of identical processor elements each of which does not retain execution state information from prior operations. The plurality of identical processor elements operate on a statically compiled program which, based upon detected natural concurrencies in the basic blocks of the programs, provide logical processor numbers and an instruction firing time to each instruction in each basic block. Each processor element is capable of executing instructions on a per instruction basis such that dependent instructions can execute on the same or different processor elements. A given processor element is capable of executing an instruction from one context followed by an instruction from another context through use of shared storage resources.

25 Claims, 17 Drawing Sheets

PARALLEL PROCESSOR SYSTEM FOR PROCESSING NATURAL CONCURRENCIES AND METHOD THEREFOR

This is a divisional of U.S. Ser. No. 08/254,687, filed Jun. 6, 1994, now U.S. Pat. No. 5,517,628, which is a divisional of Ser. No. 08/093,794, filed Jul. 19, 1993, now abandoned, which is a continuation of Ser. No. 07/913,736, filed Jul. 14, 1992, now abandoned, which is a continuation of Ser. No. 07/560,093, filed Jul. 30, 1990, now abandoned, which is a divisional of Ser. No. 07/372,247, filed Jun. 26, 1989, now U.S. Pat. No. 5,021,945, which is a divisional of Ser. No. 06/794,221, filed Oct. 31, 1985, now U.S. Pat. No. 4,847,755.

BACKGROUND OF THE INVENTION

1. Field of the Invention

This invention generally relates to parallel processor computer systems and, more particularly, to parallel processor computer systems having software for detecting natural concurrencies in instruction streams and having a plurality of processor elements for processing the detected natural concurrencies.

2. Description of the Prior Art

Almost all prior art computer systems are of the "Von Neumann" construction. In fact, the first four generations of computers are Von Neumann machines which use a single large processor to sequentially process data. In recent years, considerable effort has been directed towards the creation of a fifth generation computer which is not of the Von Neumann type. One characteristic of the so-called fifth generation computer relates to its ability to perform parallel computation through use of a number of processor elements. With the advent of very large scale integration (VLSI) technology, the economic cost of using a number of individual processor elements becomes cost effective.

Whether or not an actual fifth generation machine has yet been constructed is subject to debate, but various features have been defined and classified. Fifth-generation machines should be capable of using multiple-instruction, multiple-data (MIMD) streams rather than simply being a single instruction, multiple-data (SIMD) system typical of fourth generation machines. The present invention is of the fifth-generation non-Von Neumann type. It is capable of using MIMD streams in single context (SC-MIMD) or in multiple context (MC-MIMD) as those terms are defined below. The present invention also finds application in the entire computer classification of single and multiple context SIMD (SC-SIMD and MC-SIMD) machines as well as single and multiple context, single-instruction, single data (SC-SISD and MC-SISD) machines.

While the design of fifth-generation computer systems is fully in a state of flux, certain categories of systems have been defined. Some workers in the field base the type of computer upon the manner in which "control" or "synchronization" of the system is performed. The control classification includes control-driven, data-driven, and reduction (or demand) driven. The control-driven system utilizes a centralized control such as a program counter or a master processor to control processing by the slave processors. An example of a control-driven machine is the Non-von-1 machine at Columbia University. In data-driven systems, control of the system results from the actual arrival of data required for processing. An example of a data-driven machine is the University of Manchester dataflow machine developed in England by Ian Watson. Reduction driven systems control processing when the processed activity demands results to occur. An example of a reduction processor is the MAGO reduction machine being developed at the University of North Carolina, Chapel Hill. The characteristics of the non-von-1 machine, the Manchester machine, and the MAGO reduction machine are carefully discussed in Davis, "Computer Architecture," *IEEE Spectrum*, November, 1983. In comparison, data-driven and demand-driven systems are decentralized approaches whereas control-driven systems represent a centralized approach. The present invention is more properly categorized in a fourth classification which could be termed "time-driven." Like data-driven and demand-driven systems, the control system of the present invention is decentralized. However, like the control-driven system, the present invention conducts processing when an activity is ready for execution.

Most computer systems involving parallel processing concepts have proliferated from a large number of different types of computer architectures. In such cases, the unique nature of the computer architecture mandates or requires either its own processing language or substantial modification of an existing language to be adapted for use. To take advantage of the highly parallel structure of such computer architectures, the programmer is required to have an intimate knowledge of the computer architecture in order to write the necessary software. As a result, preparing programs for these machines requires substantial amounts of the users effort, money and time.

Concurrent to this activity, work has also been progressing on the creation of new software and languages, independent of a specific computer architecture, that will expose (in a more direct manner), the inherent parallelism of the computation process. However, most effort in designing supercomputers has been concentrated in developing new hardware with much less effort directed to developing new software.

Davis has speculated that the best approach to the design of a fifth-generation machine is to concentrate efforts on the mapping of the concurrent program tasks in the software onto the physical hardware resources of the computer architecture. Davis terms this approach one of "task-allocation" and touts it as being the ultimate key to successful fifth-generation architectures. He categorizes the allocation strategies into two generic types. "Static allocations" are performed once, prior to execution, whereas "dynamic allocations" are performed by the hardware whenever the program is executed or run. The present invention utilizes a static allocation strategy and provides task allocations for a given program after compilation and prior to execution. The recognition of the "task allocation" approach in the design of fifth generation machines was used by Davis in the design of his "Data-driven Machine-II" constructed at the University of Utah. In the Data-driven Machine-II, the program was compiled into a program graph that resembles the actual machine graph or architecture.

Task allocation is also referred to as "scheduling" in Gaiski et al, "Essential Issues in Multi-processor Systems," *Computer*, June, 1985. Gajski et al set forth levels of scheduling to include high level, intermediate level, and low level scheduling. The present invention is one of low-level scheduling, but it does not use conventional scheduling policies of "first-in-first-out", "round-robin", "shortest type in job-first", or "shortest-remaining-time." Gajski et al also recognize the advantage of static scheduling in that overhead costs are paid at compile time. However, Gajski et al's recognized disadvantage, with respect to static scheduling, of possible inefficiencies in guessing the run time profile of each task is not found in the present invention. Therefore, the conventional approaches to low-level static scheduling found in the Occam language and the Bulldog compiler are not found in the software portion of the present invention. Indeed, the low-level static scheduling of the present invention provides the same type, if not better, utilization of the processors commonly seen in dynamic scheduling by the machine at run time. Furthermore, the low-level static scheduling of the present invention is performed automatically without intervention of programmers as required (for example) in the Occam language.

Davis further recognizes that communication is a critical feature in concurrent processing in that the actual physical topology of the system significantly influences the overall performance of the system.

For example, the fundamental problem found in most data-flow machines is the large amount of communication overhead in moving data between the processors. When data is moved over a bus, significant overhead, and possible degradation of the system, can result if data must contend for access to the bus. For example, the Arvind data-flow machine, referenced in Davis, utilizes an I-structure stream in order to allow the data to remain in one place which then becomes accessible by all processors. The present invention, in one aspect, teaches a method of hardware and software based upon totally coupling the hardware resources thereby significantly simplifying the communication problems inherent in systems that perform multiprocessing.

Another feature of non-Von Neumann type multiprocessor systems is the level of granularity of the parallelism being processed. Gajski et al term this "partitioning." The goal in designing a system, according to Gajski et al, is to obtain as much parallelism as possible with the lowest amount of overhead. The present invention performs concurrent processing at the lowest level available, the "per instruction" level. The present invention, in another aspect, teaches a method whereby this level of parallelism is obtainable without execution time overhead.

Despite all of the work that has been done with multiprocessor parallel machines, Davis (Id. at 99) recognizes that such software and/or hardware approaches are primarily designed for individual tasks and are not universally suitable for all types of tasks or programs as has been the hallmark with Von Neumann architectures. The present invention sets forth a computer system and method that is generally suitable for many different types of tasks since it operates on the natural concurrencies existent in the instruction stream at a very fine level of granularity.

All general purpose computer systems and many special purpose computer systems have operating systems or monitor/control programs which support the processing of multiple activities or programs. In some cases this processing occurs simultaneously; in other cases the processing alternates among the activities such that only one activity controls the processing resources at any one time. This latter case is often referred to as time sharing, time slicing, or concurrent (versus simultaneous) execution, depending on the particular computer system. Also depending on the specific system, these individual activities or programs are usually referred to as tasks, processes, or contexts. In all cases, there is a method to support the switching of control among these various programs and between the programs and the operating system, which is usually referred to as task switching, process switching, or context switching. Throughout this document, these terms are considered synonymous, and the terms context and context switching are generally used.

The present invention, therefore, pertains to a non-Von Neumann MIMD computer system capable of simultaneously operating upon many different and conventional programs by one or more different users. The natural concurrencies in each program are statically allocated, at a very fine level of granularity, and intelligence is added to the instruction stream at essentially the object code level. The added intelligence can include, for example, a logical processor number and an instruction firing time in order to provide the time-driven decentralized control for the present invention. The detection and low level scheduling of the natural concurrencies and the adding of the intelligence occurs only once for a given program, after conventional compiling of the program, without user intervention and prior to execution. The results of this static allocation are executed on a system containing a plurality of processor elements. In one embodiment of the invention, the processors are identical. The processor elements, in this illustrated embodiment, contain no execution state information from the execution of previous instructions, that is, they are context free. In addition, a plurality of context files, one for each user, are provided wherein the plurality of processor elements can access any storage resource contained in any context file through total coupling of the processor element to the shared resource during the processing of an instruction. In a preferred aspect of the present invention, no condition code or results registers are found on the individual processor elements.

SUMMARY OF INVENTION

The present invention provides a method and a system that is non-Von Neumann and one which is adaptable for use in single or multiple context SISD, SIMD, and MIMD configurations. The method and system is further operative upon a myriad of conventional programs without user intervention.

In one aspect, the present invention statically determines at a very fine level of granularity, the natural concurrencies in the basic blocks (BBs) of programs at essentially the object code level and adds intelligence to the instruction stream in each basic block to provide a time driven decentralized control. The detection and low level scheduling of the natural concurrencies and the addition of the intelligence occurs only once for a given program after conventional compiling and prior to execution. At this time, prior to program execution, the use during later execution of all instruction resources is assigned.

In another aspect, the present invention further executes the basic blocks containing the added intelligence on a system containing a plurality of processor elements each of which, in this particular embodiment, does not retain execution state information from prior operations. Hence, all processor elements in accordance with this embodiment of the invention are context free. Instructions are selected for execution based on the instruction firing time. Each processor element in this embodiment is capable of executing instructions on a per-instruction basis such that dependent instructions can execute on the same or different processor elements. A given processor element in the present invention is capable of executing an instruction from one context followed by an instruction from another context. All operating and context information necessary for processing a given instruction is then contained elsewhere in the system.

It should be noted that many alternative implementations of context free processor elements are possible. In a non-pipelined implementation each processor element is monolithic and executes a single instruction to its completion prior to accepting another instruction.

In another aspect of the invention, the context free processor is a pipelined processor element, in which each instruction requires several machine instruction clock cycles to complete. In general, during each clock cycle, a new instruction enters the pipeline and a completed instruction exists the pipeline, giving an effective instruction execution time of a single instruction clock cycle. However, it is also possible to microcode some instructions to perform complicated functions requiring many machine instruction cycles. In such cases the entry of new instructions is suspended until the complex instruction completes, after which the normal instruction entry and exit sequence in each clock cycle continues. Pipelining is a standard processor implementation technique and is discussed in more detail later.

The system and method of the present invention are described in the following drawing and specification.

DESCRIPTION OF THE DRAWING

Other objects, features, and advantages of the invention will appear from the following description taken together with the drawings in which.

GENERAL DESCRIPTION

1. Introduction

In the following two sections, a general description of the software and hardware of the present invention takes place. The system of the present invention is designed based upon a unique relationship between the hardware and software components. While many prior art approaches have primarily provided for multiprocessor parallel processing based upon a new architecture design or upon unique software algorithms, the present invention is based upon a unique hardware/software relationship. The software of the present invention provides the intelligent information for the routing and synchronization of the instruction streams through the hardware. In the performance of these tasks, the software spatially and temporally manages all user accessible resources, for example, general registers, condition code storage registers, memory and stack pointers. The routing and synchronization are performed without user intervention, and do not require changes to the original source code. Additionally, the analysis of an instruction stream to provide the additional intelligent information for controlling the routing and synchronization of the instruction stream is performed only once during the program preparation process (often called "static allocation") of a given piece of software, and is not performed during execution (often called "dynamic allocation") as is found in some conventional prior art approaches. The analysis effected according to the invention is hardware dependent, is performed on the object code output from conventional compilers, and advantageously, is therefore programming language independent.

In other words, the software, according to the invention, maps the object code program onto the hardware of the system so that it executes more efficiently than is typical of prior art systems. Thus the software must handle all hardware idiosyncrasies and their effects on execution of the program instructions stream. For example, the software must accommodate, when necessary, processor elements which are either monolithic single cycle or pipelined.

2. General Software Description

Figure 1:
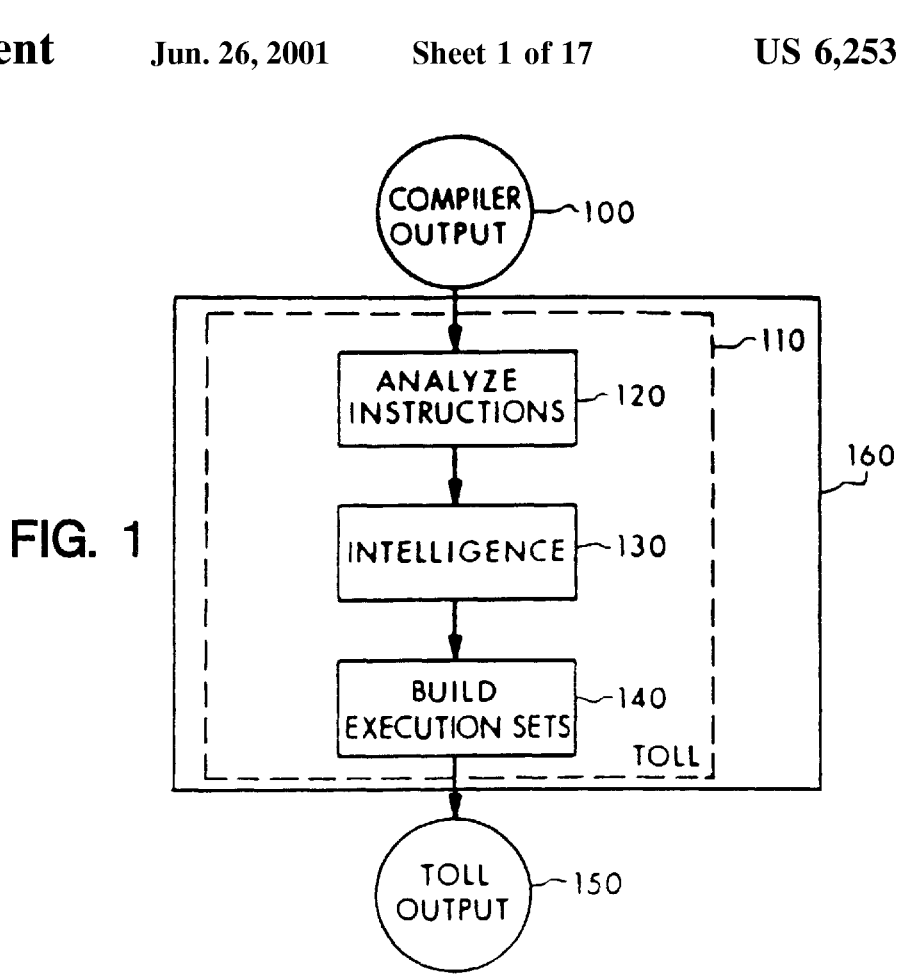
FIG. 1 is the generalized flow representation of the TOLL software of the present invention.

Referring to FIG. 1, the software of the present invention, generally termed "TOLL," is located in a computer processing system 160. Processing system 160 operates on a standard compiler output 100 which is typically object code or an intermediate object code such as "p-code." The output of a conventional compiler is a sequential stream of object code instructions hereinafter referred to as the instruction stream. Conventional language processors typically perform the following functions in generating the sequential instruction stream:

1. lexical scan of the input text,
2. syntactical scan of the condensed input text including symbol table construction,
3. performance of machine independent optimization including parallelism detection and vectorization, and 4. an intermediate (PSEUDO) code generation taking into account instruction functionality, resources required, and hardware structural properties.

In the creation of the sequential instruction stream, the conventional compiler creates a series of basic blocks (BBs) which are single entry single exit (SESE) groups of contiguous instructions. See, for example, Alfred v. Aho and Jeffery D. Ullman, *Principles of Compiler Design*, Addison Wesley, 1979, pg. 6, 409, 412–413 and David Gries, *Compiler Construction for Digital Computers*, Wiley, 1971. The conventional compiler, although it utilizes basic block information in the performance of its tasks, provides an output stream of sequential instructions without any basic block designations. The TOLL software, in this illustrated embodiment of the present invention, is designed to operate on the formed basic blocks (BBs) which are created within a conventional compiler. In each of the conventional SESE basic blocks there is exactly one branch (at the end of the block) and there are no control dependencies. The only relevant dependencies within the block are those between the resources required by the instructions.

Figure 2:
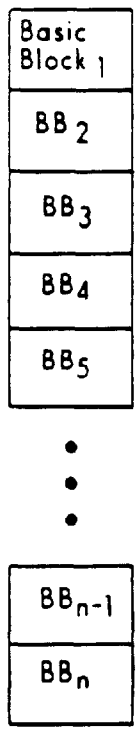
FIG. 2 is a graphic representation of a sequential series of basic blocks found within the conventional compiler output.

The output of the compiler 100 in the basic block format is illustrated in FIG. 2. Referring to FIG. 1, the TOLL software 110 of the present invention being processed in the computer 160 performs three basic determining functions on the compiler output 100. These functions are to analyze the resource usage of the instructions 120, extend intelligence for each instruction in each basic block 130, and to build execution sets composed of one or more basic blocks 140. The resulting output of these three basic functions 120, 130, and 140 from processor 160 is the TOLL software output 150 of the present invention.

As noted above, the TOLL software of the present invention operates on a compiler output 100 only once and without user intervention. Therefore, for any given program, the TOLL software need operate on the compiler output 100 only once.

The functions 120, 130, 140 of the TOLL software 110 are, for example, to analyze the instruction stream in each basic block for natural concurrencies, to perform a translation of the instruction stream onto the actual hardware system of the present invention, to alleviate any hardware induced idiosyncrasies that may result from the translation process, and to encode the resulting instruction stream into an actual machine language to be used with the hardware of the present invention. The TOLL software 110 performs these functions by analyzing the instruction stream and then assigning processor elements and resources as a result thereof. In one particular embodiment, the processors are context free. The TOLL software 110 provides the "synchronization" of the overall system by, for example, assigning appropriate firing times to each instruction in the output instruction stream.

Instructions can be dependent on one another in a variety of ways although there are only three basic types of dependencies. First, there are procedural dependencies due to the actual structure of the instruction stream; that is, instructions may follow one another in other than a sequential order due to branches, jumps, etc. Second, operational dependencies are due to the finite number of hardware elements present in the system. These hardware elements include the general registers, condition code storage, stack pointers, processor elements, and memory. Thus if two instructions are to execute in parallel, they must not require the same hardware element unless they are both reading that element (provided of course, that the element is capable of being read simultaneously). Finally, there are data dependencies between instructions in the instruction stream. This form of dependency will be discussed at length later and is particularly important if the processor elements include pipelined processors. Within a basic block, however, only data and operational dependencies are present.

The TOLL software 110 must maintain the proper execution of a program. Thus, the TOLL software must assure that the code output 150, which represents instructions which will execute in parallel, generates the same results as those of the original serial code. To do this, the code 150 must access the resources in the same relative sequence as the serial code for instructions that are dependent on one another; that is, the relative ordering must be satisfied. However, independent sets of instructions may be effectively executed out of sequence.

In Table 1 is set forth an example of a SESE basic block representing the inner loop of a matrix multiply routine. While, this example will be used throughout this specification, the teachings of the present invention are applicable to any instruction stream. Referring to Table 1, the instruction designation is set forth in the right hand column and a conventional object code functional representation, for this basic block, is represented in the left hand column.

TABLE 1

| OBJECT CODE | INSTRUCTION |
|---|---|
| LD R0, (R10) + | I0 |
| LD R1, (R11) + | I1 |
| MM R0, R1, R2 | I2 |
| ADD R2, R3, R3 | I3 |
| DEC R4 | I4 |
| BRNZR LOOP | I5 |

The instruction stream contained within the SESE basic block set forth in Table 1 performs the following functions. In instruction I0, register R0 is loaded with the contents of memory whose address is contained in R10. The instruction shown above increments the contents of R10 after the address has been fetched from R10. The same statement can be made for instruction I1, with the exception that register R1 is loaded and register R11 is incremented. Instruction I2 causes the contents of registers R0 and R1 to be multiplied and the result is stored in register R2. In instruction I3, the contents of register R2 and register R3 are added and the result is stored in register R3. in instruction I4, register R4 is decremented. Instructions I2, I3 and I4 also generate a set of condition codes that reflect the status of their respective execution. In instruction I5, the contents of register R4 are indirectly tested for zero (via the condition codes generated by instruction I4). A branch occurs if the decrement operation produced a non-zero value; otherwise execution proceeds with the first instruction of the next basic block.

Referring to FIG. 1, the first function performed by the TOLL software 110 is to analyze the resource usage of the instructions. In the illustrated example, these are instructions I0 through I5 of Table I. The TOLL software 110 thus analyzes each instruction to ascertain the resource requirements of the instruction.

This analysis is important in determining whether or not any resources are shared by any instructions and, therefore, whether or not the instructions are independent of one another. Clearly, mutually independent instructions can be executed in parallel and are termed "naturally concurrent." Instructions that are independent can be executed in parallel and do not rely on one another for any information nor do they share any hardware resources in other than a read only manner.

On the other hand, instructions that are dependent on one another can be formed into a set wherein each instruction in the set is dependent on every other instruction in that set. The dependency may not be direct. The set can be described by the instructions within the set, or conversely, by the resources used by the instructions in the set. Instructions within different sets are completely independent of one another, that is, there are no resources shared by the sets. Hence, the sets are independent of one another.

In the example of Table 1, the TOLL software will determine that there are two independent sets of dependent instructions:

Set 1: CC1: I0, I1, I2, I3
Set 2: CC2: I4, I5

As can be seen, instructions I4 and I5 are independent of instructions I0–I3. In set 2, I5 is directly dependent on I4. In set 1, I2 is directly dependent on I0 and I1. Instruction I3 is directly dependent on I2 and indirectly dependent on I0 and I1.

The TOLL software of the present invention detects these independent sets of dependent instructions and assigns a condition code group of designation(s), such as CC1 and CC2, to each set. This avoids the operational dependency that would occur if only one group or set of condition codes were available to the instruction stream.

In other words, the results of the execution of instructions I0 and I1 are needed for the execution of instruction I2. Similarly, the results of the execution of instruction I2 are needed for the execution of instruction I3. In performing this analyses, the TOLL software 110 determines if an instruction will perform a read and/or a write to a resource. This functionality is termed the resource requirement analysis of the instruction stream.

It should be noted that, unlike the teachings of the prior art, the present invention teaches that it is not necessary for dependent instructions to execute on the same processor element. The determination of dependencies is needed only to determine condition code sets and to determine instruction firing times, as will be described later. The present invention can execute dependent instructions on different processor elements, in one illustrated embodiment, because of the context free nature of the processor elements and the total coupling of the processor elements to the shared resources, such as the register files, as will also be described below.

The results of the analysis stage 120, for the example set forth in Table 1, are set forth in Table 2.

TABLE 2

| INSTRUCTION | FUNCTION |
| --- | --- |
| I0 | Memory Read, Reg. Write, Reg. Read & Write |
| I1 | Memory Read, Reg. Write, Reg. Read & write |
| I2 | Two Reg. Reads, Reg. Write, Set Cond. Code (Set #1) |
| I3 | Two Reg. Reads, Reg. Write, Set Cond. Code (Set #1) |
| I4 | Read Reg., Reg. Write, Set Cond. Code (Set #2) |
| I5 | Read Cond. Code (Set #2) |

In Table 2, for instructions I0 and I1, a register is read and written followed by a memory read (at a distinct address), followed by a register write. Likewise, condition code writes and register reads and writes occur for instructions I2 through I4. Finally, instruction I5 is a simple read of a condition code storage register and a resulting branch or loop.

The second step or pass 130 through the SESE basic block 100 is to add or extend intelligence to each instruction within the basic block. In the preferred embodiment of the invention, this is the assignment of an instruction's execution time relative to the execution times of the other instructions in the stream, the assignment of a processor number on which the instruction is to execute and the assignment of any so-called static shared context storage mapping information that may be needed by the instruction.

In order to assign the firing time to an instruction, the temporal usage of each resource required by the instruction must be considered. In the illustrated embodiment, the temporal usage of each resource is characterized by a "free time" and a "load time." The free time is the last time the resource was read or written by an instruction. The load time is the last time the resource was modified by an instruction. If an instruction is going to modify a resource, it must execute the modification after the last time the resource was used, in other words, after the free time. If an instruction is going to read the resource, it must perform the read after the last time the resource has been loaded, in other words, after the load time.

The relationship between the temporal usage of each resource and the actual usage of the resource is as follows. If an instruction is going to write/modify the resource, the last time the resource is read or written by other instructions (i.e., the "free time" for the resource) plus one time interval will be the earliest firing time for this instruction. The "plus one time interval" comes from the fact that an instruction is still using the resource during the free time. On the other hand, if the instruction reads a resource, the last time the resource is modified by other instructions (i.e., the load time for the resource) plus one time interval will be the earliest instruction firing time. The "plus one time interval" comes from the time required for the instruction that is performing the load to execute.

The discussion above assumes that the exact location of the resource that is accessed is known. This is always true of resources that are directly named such as general registers and condition code storage. However, memory operations may, in general, be to locations unknown at compile time. In particular, addresses that are generated by effective addressing constructs fall in this class. In the previous example, it has been assumed (for the purposes of communicating the basic concepts of TOLL) that the addresses used by instructions I0 and I1 are distinct. If this were not the case, the TOLL software would assure that only those instructions that did not use memory would be allowed to execute in parallel with an instruction that was accessing an unknown location in memory.

The instruction firing time is evaluated by the TOLL software 110 for each resource that the instruction uses. These "candidate" firing times are then compared to determine which is the largest or latest time. The latest time determines the actual firing time assigned to the instruction. At this point, the TOLL software 110 updates all of the resources' free and load times, to reflect the firing time assigned to the instruction. The TOLL software 110 then proceeds to analyze the next instruction.

There are many methods available for determining inter-instruction dependencies within a basic block. The previous discussion is just one possible implementation assuming a specific compiler-TOLL partitioning. Many other compiler-TOLL partitionings and methods for determining inter-instruction dependencies may be possible and realizable to one skilled in the art. Thus, the illustrated TOLL software uses a linked list analysis to represent the data dependencies within a basic block. Other possible data structures that could be used are trees, stacks, etc.

Assume a linked list representation is used for the analysis and representation of the inter-instruction dependencies. Each register is associated with a set of pointers to the instructions that use the value contained in that register. For the matrix multiply example in Table 1, the resource usage is set forth in Table 3:

TABLE 3

| Resource | Loaded By | Read By |
|----------|-----------|---------|
| R0 | I0 | I2 |
| R1 | I1 | I2 |
| R2 | I2 | I3 |
| R3 | I3 | I3, I2 |
| R4 | I4 | I5 |
| R10 | I0 | I0 |
| R11 | I1 | I1 |

Thus, by following the "Read by" links and knowing the resource utilization for each instruction, the independencies of Sets 1 and 2, above, are constructed in the analyze instruction stage 120 (FIG. 1) by TOLL 110.

For purposes of analyzing further the example of Table 1, it is assumed that the basic block commences with an arbitrary time interval in an instruction stream, such as, for example, time interval T16. In other words, this particular basic block in time sequence is assumed to start with time interval T16. The results of the analysis in stage 120 are set forth in Table 4.

TABLE 4

| REG | I0 | I1 | I2 | I3 | I4 | I5 |
|-----|-----|-----|-----|-----|-----|-----|
| R0 | T16 | | T17 | | | |
| R1 | | T16 | T17 | | | |
| R2 | | | <u>T17</u> | T18 | | |
| R3 | | | | <u>T18</u> | | |
| R4 | | | | | T16 | |
| CC1 | | | T17 | T18 | | |
| CC2 | | | | | | <u>T17</u> |
| R10 | T16 | | | | | |
| R11 | | T16 | | | | |

The vertical direction in Table 4 represents the general registers and condition code storage registers. The horizontal direction in the table represents the instructions in the basic block example of Table 1. The entries in the table represent usage of a register by an instruction. Thus, instruction I0 requires that register R10 be read and written and register R0 written at time T16, the start of execution of the basic block.

Under the teachings of the present invention, there is no reason that registers R1, R11, and R4 cannot also have operations performed on them during time T16. The three instructions, I0, I1, and I4, are data independent of each other and can be executed concurrently during time T16. Instruction I2, however, requires first that registers R0 and R1 be loaded so that the results of the load operation can be multiplied. The results of the multiplication are stored in register R2. Although, register R2 could in theory be operated on in time T16, instruction I2 is data dependent upon the results of loading registers R0 and R1, which occurs during time T16. Therefore, the completion of instruction I2 must occur during or after time frame T17. Hence, in Table 4 above, the entry T17 for the intersection of instruction I2 and register R2 is underlined because it is data dependent. Likewise, instruction I3 requires data in register R2 which first occurs during time T17. Hence, instruction I3 can operate on register R2 only during or after time T18.

Instruction I5 depends upon the reading of the condition code storage CC2 which is updated by instruction I4. The reading of the condition code storage CC2 is data dependent upon the results stored in time T16 and, therefore, must occur during or after the next time, T17.

Hence, in stage 130, the object code instructions are assigned "instruction firing times" (IFTs) as set forth in Table 5 based upon the above analysis.

TABLE 5

| OBJECT CODE INSTRUCTION | INSTRUCTION FIRING TIME (IFT) |
|--------------------------|-------------------------------|
| I0 | T16 |
| I1 | T16 |
| I2 | T17 |
| I3 | T18 |
| I4 | T16 |
| I5 | T17 |

Each of the instructions in the sequential instruction stream in a basic block can be performed in the assigned time intervals. As is clear in Table 5, the same six instructions of Table 1, normally processed sequentially in six cycles, can be processed, under the teachings of the present invention, in only three firing times: T16, T17, and T18. The instruction firing time (IFT) provides the "time-driven" feature of the present invention.

The next function performed by stage 130, in the illustrated embodiment, is to reorder the natural concurrencies in the instruction stream according to instruction firing times (IFTs) and then to assign the instructions to the individual logical parallel processors. It should be noted that the reordering is only required due to limitations in currently available technology. If true fully associative memories were available, the reordering of the stream would not be required and the processor numbers could be assigned in a first come, first served manner. The hardware of the instruction selection mechanism could be appropriately modified by one skilled in the art to address this mode of operation.

For example, assuming currently available technology, and a system with four parallel processor elements (PEs) and a branch execution unit (BEU) within each LRD, the processor elements and the branch execution unit can be assigned, under the teachings of the present invention, as set forth in Table 6 below. It should be noted that the processor elements execute all non-branch instructions, while the branch execution unit (BEU) of the present invention executes all branch instructions. These hardware circuitries will be described in greater detail subsequently.

TABLE 6

| Logical Processor Number | T16 | T17 | T18 |
|--------------------------|-----|-----|-----|
| 0 | I0 | I2 | I3 |
| 1 | I1 | — | — |
| 2 | I4 | — | — |
| 3 | — | — | — |
| BEU | — | I5 (delay) | — |

Hence, under the teachings of the present invention, during time interval T16, parallel processor elements 0, 1, and 2 concurrently process instructions I0, I1, and I4 respectively. Likewise, during the next time interval T17, parallel processor element 0 and the BEU concurrently process instructions I2 and I5 respectively. And finally, during time interval T18, processor element 0 processes instruction I3. During instruction firing times T16, T17, and T18, parallel processor element 3 is not utilized in the example of Table 1. In actuality, since the last instruction is a branch instruction, the branch cannot occur until the last processing is finished in time T18 for instruction I3. A delay field is built into the processing of instruction I5 so that even though it is processed in time interval T17 (the earliest possible time), its execution is delayed so that looping or branching out occurs after instruction I3 has executed.

In summary, the TOLL software 110 of the present illustrated embodiment, in stage 130, examines each individual instruction and its resource usage both as to type and as to location (if known) (e.g., Table 3). It then assigns instruction firing times (IFTs) on the basis of this resource usage (e.g., Table 4), reorders the instruction stream based upon these firing times (e.g., Table 5) and assigns logical processor numbers (LPNs) (e.g., Table 6) as a result thereof.

Figure 3:
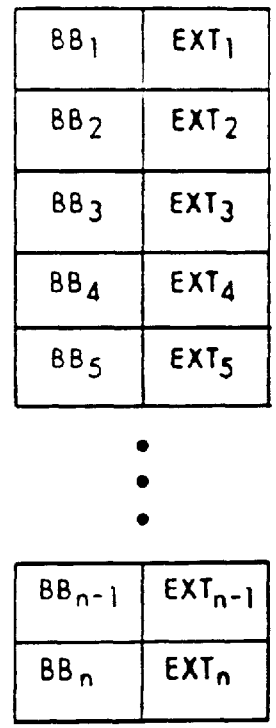
FIG. 3 is a graphical presentation of the extended intelligence added to each basic block according to one embodiment of the present invention.
Figure 4:
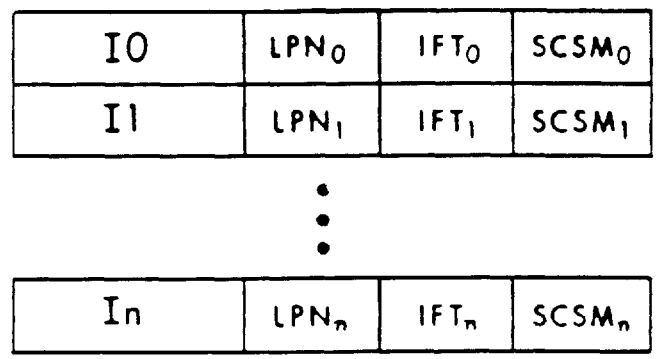
FIG. 4 is a graphical representation showing the details of the extended intelligence added to each instruction within a given basic block according to one embodiment of the present invention.

The extended intelligence information involving the logical processor number (LPN) and the instruction firing time (IFT) is, in the illustrated embodiment, added to each instruction of the basic block as shown in FIGS. 3 and 4. As will also be pointed out subsequently, the extended intelligence (EXT) for each instruction in a basic block (BB) will be correlated with the actual physical processor architecture of the present invention. The correlation is performed by the system hardware. It is important to note that the actual hardware may contain less, the same as, or more physical processor elements than the number of logical processor elements.

The Shared Context Storage Mapping (SCSM) information in FIG. 4 and attached to each instruction in this illustrated and preferred embodiment of the invention, has a static and a dynamic component. The static component of the SCSM information is attached by the TOLL software or compiler and is a result of the static analysis of the instruction stream. Dynamic information is attached at execution time by a logical resource drive (LRD) as will be discussed later.

At this stage 130, the illustrated TOLL software 110 has analyzed the instruction stream as a set of single entry single exit (SESE) basic blocks (BBs) for natural concurrencies that can be processed individually by separate processor elements (PEs) and has assigned to each instruction an instruction firing time (IFT) and a logical processor number (LPN). Under the teachings of the present invention, the instruction stream is thus pre-processed by the TOLL software to statically allocate all processing resources in advance of execution. This is done once for any given program and is applicable to any one of a number of different program languages such as FORTRAN, COBOL, PASCAL, BASIC, etc.

Figure 5:
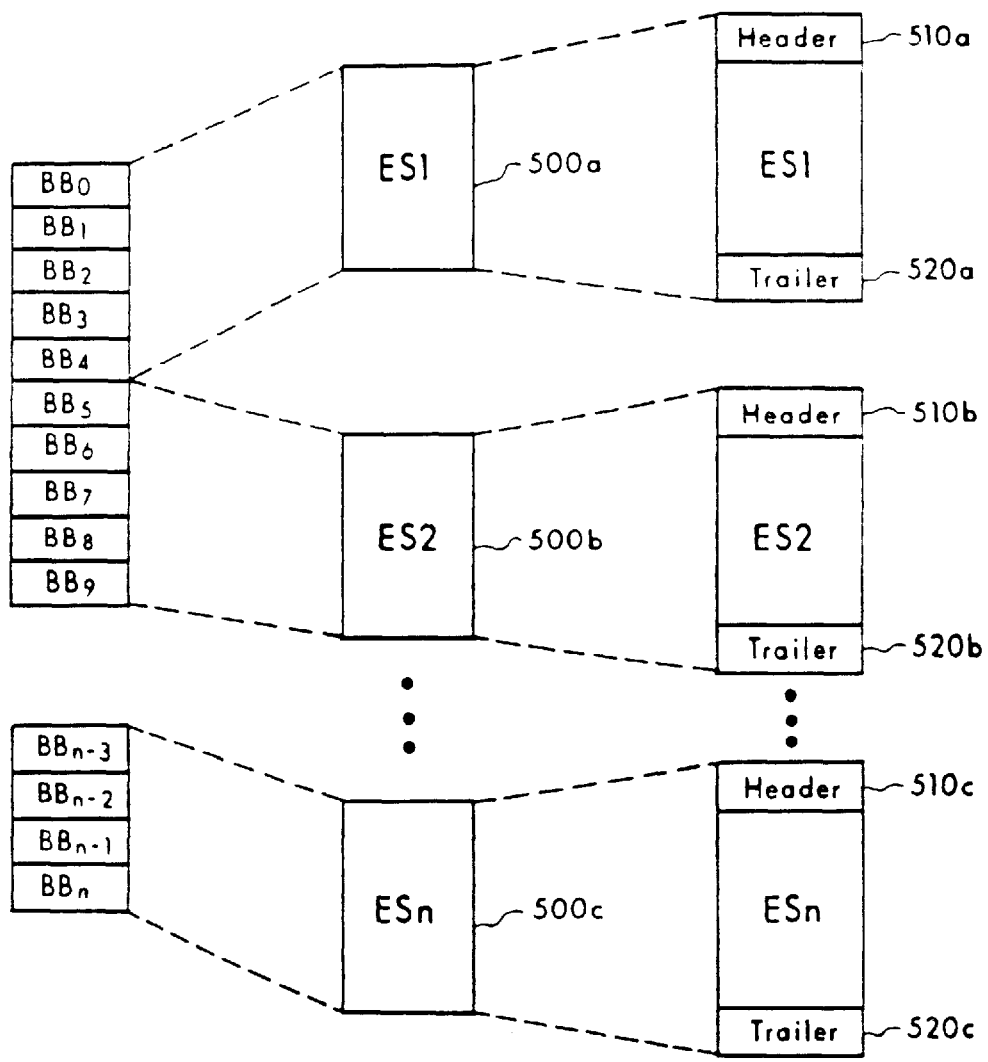
FIG. 5 is the breakdown of the basic blocks into discrete execution sets.

Referring to FIG. 5, a series of basic blocks (BBs) can form a single execution set (ES) and in stage 140, the TOLL software 110 builds such execution sets (ESs). Once the TOLL software identifies an execution set 500, header 510 and/or trailer 520 information is added at the beginning and/or end of the set. In the preferred embodiment, only header information 510 is attached at the beginning of the set, although the invention is not so limited.

Under the teachings of the present invention, basic blocks generally follow one another in the instruction stream. There may be no need for reordering of the basic blocks even though individual instructions within a basic block, as discussed above, are reordered and assigned extended intelligence information. However, the invention is not so limited. Each basic block is single entry and single exit (SESE) with the exit through a branch instruction. Typically, the branch to another instruction is within a localized neighborhood such as within 400 instructions of the branch. The purpose of forming the execution sets (stage 140) is to determine the minimum number of basic blocks that can exist within an execution set such that the number of "instruction cache faults" is minimized. In other words, in a given execution set, branches or transfers out of an execution set are statistically minimized. The TOLL software in stage 140, can use a number of conventional techniques for solving this linear programming-like problem, a problem which is based upon branch distances and the like. The purpose is to define an execution set as set forth in FIG. 5 so that the execution set can be placed in a hardware cache, as will be discussed subsequently, to minimize instruction cache faults (i.e., transfers out of the execution set).

What has been set forth above is an example, illustrated using Tables 1 through 6, of the TOLL software 110 in a single context application. In essence, the TOLL software determines the natural concurrencies within the instruction streams for each basic block within a given program. The TOLL software adds, in the illustrated embodiment, an instruction firing time (IFT) and a logical processor number (LPN) to each instruction in accordance with the determined natural concurrencies. All processing resources are statically allocated in advance of processing. The TOLL software of the present invention can be used in connection with a number of simultaneously executing different programs, each program being used by the same or different users on a processing system of the present invention as will be described and explained below.

3. General Hardware Description

Figure 6:
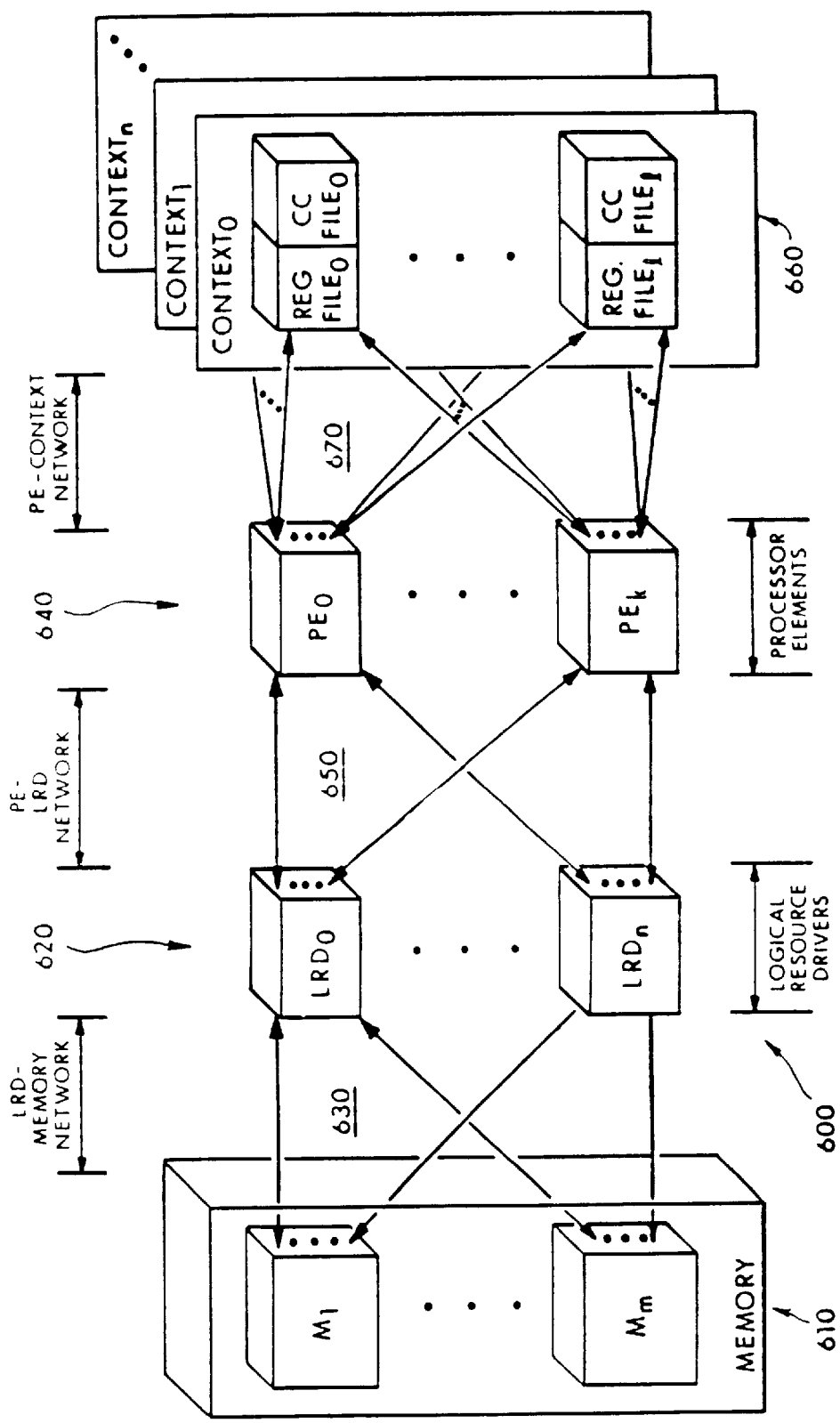
FIG. 6 is a block diagram presentation of the architectural structure of apparatus according to a preperred embodiment of the present invention.

Referring to FIG. 6, the block diagram format of the system architecture of the present invention, termed the TDA system architecture 600, includes a memory subsystem 610 interconnected to a plurality of logical resource drivers (LRDs) 620 over a network 630. The logical resource drivers 620 are further interconnected to a plurality of processor elements 640 over a network 650. Finally, the plurality of processor elements 640 are interconnected over a network 670 to the shared resources containing a pool of register set and condition code set files 660. The LRD-memory network 630, the PE-LRD network 650, and the PE-context file network 670 are full access networks that could be composed of conventional crossbar networks, omega networks, banyan networks, or the like. The networks are full access (non-blocking in space) so that, for example, any processor element 640 can access any register file or condition code storage in any context (as defined hereinbelow) file 660. Likewise, any processor element 640 can access any logical resource driver 620 and any logical resource driver 620 can access any portion of the memory subsystem 610. In addition, the PE-LRD and PE-context file networks are non-blocking in time. In other words, these two networks guarantee access to any resource from any resource regardless of load conditions on the network. The architecture of the switching elements of the PE-LRD network 650 and the PE-context file network 670 are considerably simplified since the TOLL software guarantees that collisions in the network will never occur. The diagram of FIG. 6 represents an MIMD system wherein each context file 660 corresponds to at least one user program.

The memory subsystem 610 can be constructed using a conventional memory architecture and conventional memory elements. There are many such architectures and elements that could be employed by a person skilled in the art and which would satisfy the requirements of this system. For example, a banked memory architecture could be used. (*High Speed Memory Systems,* A. V. Pohm and O. P. Agrawal, Reston Publishing Co., 1983.)

The logical resource drivers 620 are unique to the system architecture 600 of the present invention. Each illustrated LRD provides the data cache and instruction selection support for a single user (who is assigned a context file) on a timeshared basis. The LRDs receive execution sets from the various users wherein one or more execution sets for a context are stored on an LRD. The instructions within the basic blocks of the stored execution sets are stored in queues based on the previously assigned logical processor number. For example, if the system has 64 users and 8 LRDS, 8 users would share an individual LRD on a timeshared basis. The operating system determines which user is assigned to which LRD and for how long. The LRD is detailed at length subsequently.

The processor elements 640 are also unique to the TDA system architecture and will be discussed later. These processor elements in one particular aspect of the invention display a context free stochastic property in which the future state of the system depends only on the present state of the system and not on the path by which the present state was achieved. As such, architecturally, the context free processor elements are uniquely different from conventional processor elements in two ways. First, the elements have no internal permanent storage or remnants of past events such as general purpose registers or program status words. Second, the elements do not perform any routing or synchronization functions. These tasks are performed by the TOLL software and are implemented in the LRDs. The significance of the architecture is that the context free processor elements of the present invention are a true shared resource to the LRDs. In another preferred particular embodiment of the invention wherein pipelined processor elements are employed, the processors are not strictly context free as was described previously.

Finally, the register set and condition code set files 660 can also be constructed of commonly available components such as AMD 29300 series register files, available from Advanced Micro Devices, 901 Thompson Place, P.O. Box 3453, Sunnyvale, Calif. 94088. However, the particular configuration of the files 660 illustrated in FIG. 6 is unique under the teachings of the present invention and will be discussed later.

Figure 7A:
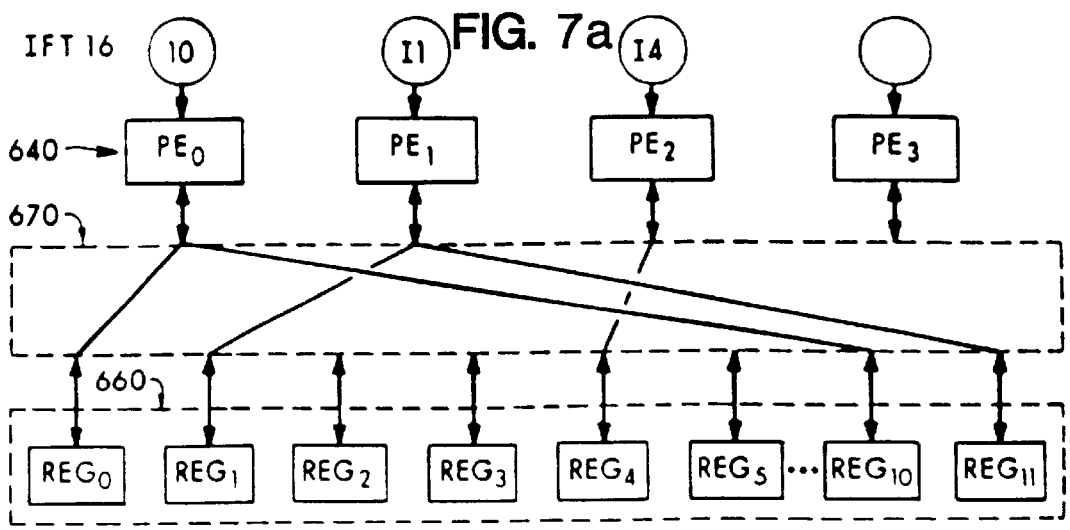
FIGS. 7a–7c represent an illustration of the network interconnections during three successive instruction firing times.
Figure 7B:
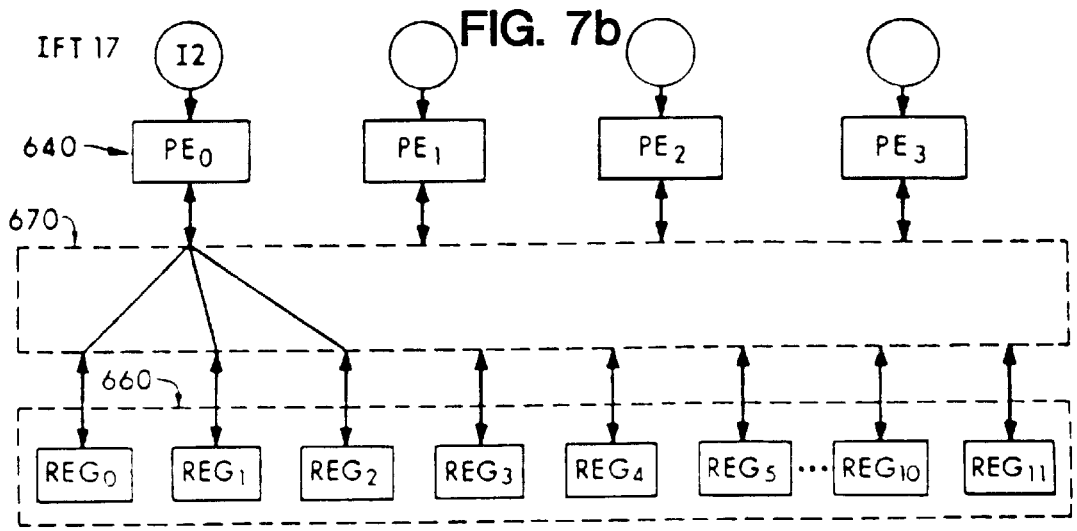
Figure 7C:
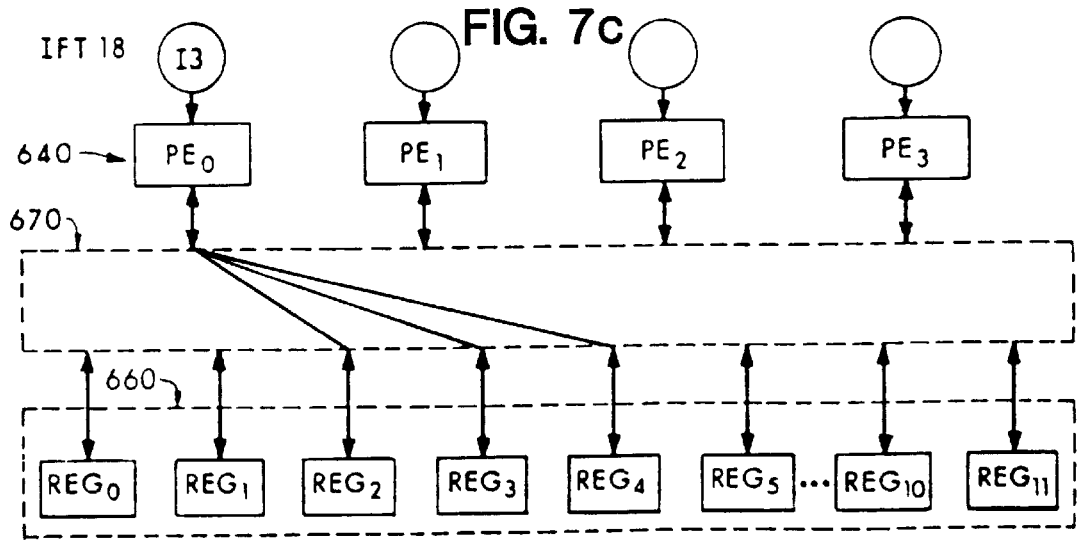

The general operation of the present invention, based upon the example set forth in Table 1, is illustrated with respect to the processor-context register file communication in FIGS. 7a, 7b, and 7c. As mentioned, the time-driven control of the present illustrated embodiment of the invention is found in the addition of the extended intelligence relating to the logical processor number (LPN) and the instruction firing time (IFT) as specifically set forth in FIG. 4. FIG. 7 generally represents the configuration of the processor elements PE0 through PE3 with registers R0 through R5, . . . , R10 and R11 of the register set and condition code set file 660.

In explaining the operation of the TDA system architecture 600 for the single user example in Table 1, reference is made to Tables 3 through 5. In the example, for instruction firing time T16, the context file-PE network 670 interconnects processor element PE0 with registers R0 and R10, processor element PE1 with registers R1 and R11, and processor element PE2 with register R4. Hence, during time T16, the three processor elements PE0, PE1, and PE2 process instructions I0, I1, and I4 concurrently and store the results in registers R0, R10, R1, R11, and R4. During time T16, the LRD 620 selects and delivers the instructions that can fire (execute) during time T17 to the appropriate processor elements. Referring to FIG. 7b, during instruction firing time T17, only processor element PE0, which is now assigned to process instruction I2 interconnects with registers R0, R1, and R2. The BEU (not shown in FIGS. 7a, 7b, and 7c) is also connected to the condition code storage. Finally, referring to FIG. 7c, during instruction firing time T18, processor element PE0 is connected to registers R2 and R3.

Several important observations need to be made. First, when a particular processor element (PE) places results of its operation in a register, any processor element, during a subsequent instruction firing time (IFT), can be interconnected to that register as it executes its operation. For example, processor element PE1 for instruction I1 loads register R1 with the contents of a memory location during IFT T16 as shown in FIG. 7a. During instruction firing time T17, processor element PE0 is interconnected with register R1 to perform an additional operation on the results stored therein. Under the teachings of the present invention, each processor element (PE) is "totally coupled" to the necessary registers in the register file 660 during any particular instruction firing time (IFT) and, therefore, there is no need to move the data out of the register file for delivery to another resource; e.g. in another processor's register as in some conventional approaches.

In other words, under the teachings of the present invention, each processor element can be totally coupled, during any individual instruction firing time, to any shared register in files 660. In addition, under the teachings of the present invention, none of the processor elements has to contend (or wait) for the availability of a particular register or for results to be placed in a particular register as is found in some prior art systems. Also, during any individual firing time, any processor element has full access to any configuration of registers in the register set file 660 as if such registers were its own internal registers.

Hence, under the teachings of the present invention, the intelligence added to the instruction stream is based upon detected natural concurrencies within the object code. The detected concurrencies are analyzed by the TOLL software, which in one illustrated embodiment logically assigns individual logical processor elements (LPNs) to process the instructions in parallel, and unique firing times (IFTs) so that each processor element (PE), for its given instruction, will have all necessary resources available for processing according to its instruction requirements. In the above example, the logical processor numbers correspond to the actual processor assignment, that is, LPN0 corresponds to PE0, LPN1 to PE1, LPN2 to PE2, and LPN3 to PE3. The invention is not so limited since any order such as LPN0 to PE1, LPN1 to PE2, etc. could be used. Or, if the TDA system had more or less than four processors, a different assignment could be used as will be discussed.

The timing control for the TDA system is provided by the instruction firing times, that is, the system is time-driven. As can be observed in FIGS. 7a through 7c, during each individual instruction firing time, the TDA system architecture composed of the processor elements 640 and the PE-register set file network 670, takes on a new and unique particular configuration fully adapted to enable the individual processor elements to concurrently process instructions while making full use of all the available resources. The processor elements can be context free and thereby data, condition, or information relating to past processing is not required, nor does it exist, internally to the processor element. The context free processor elements react only to the requirements of each individual instruction and are interconnected by the hardware to the necessary shared registers.

4. Summary

In summary, the TOLL software 110 for each different program or compiler output 100 analyzes the natural concurrencies existing in each single entry, single exit (SESE) basic block (BB) and adds intelligence, including in one illustrated embodiment, a logical processor number (LPN) and an instruction firing time (IFT), to each instruction. In an MIMD system of the present invention as shown in FIG. 6, each context file would contain data from a different user executing a program. Each user is assigned a different context file and, as shown in FIG. 7, the processor elements (PEs) are capable of individually accessing the necessary resources such as registers and condition codes storage required by the instruction. The instruction itself carries the shared resource information (that is, the registers and condition code storage). Hence, the TOLL software statically allocates only once for each program the necessary information for controlling the processing of the instruction in the TDA system architecture illustrated in FIG. 6 to insure a time-driven decentralized control wherein the memory, the logical resource drivers, the processor elements, and the context shared resources are totally coupled through their respective networks in a pure, non-blocking fashion.

The logical resource drivers (LRDs) 620 receive the basic blocks formed in an execution set and are responsible for delivering each instruction to the selected processor element 640 at the instruction firing time (IFT). While the example shown in FIG. 7 is a simplistic representation for a single user, it is to be expressly understood that the delivery by the logical resource driver 620 of the instructions to the processor elements 640, in a multi-user system, makes full use of the processor elements as will be fully discussed subsequently. Because the timing and the identity of the shared resources and the processor elements are all contained within the extended intelligence added to the instructions by the TOLL software, each processor element 640 can be completely (or in some instances substantially) context free and, in fact, from instruction firing time to instruction firing time can process individual instructions of different users as delivered by the various logical resource drivers. As will be explained, in order to do this, the logical resource drivers 620, in a predetermined order, deliver the instructions to the processor elements 640 through the PE-LRD network 650.

It is the context free nature of the processor elements which allows the independent access by any processor element of the results of data generation/manipulation from any other processor element following the completion of each instruction execution. In the case of processors which are not context free, in order for one processor to access data created by another, specific actions (usually instructions which move data from general purpose registers to memory) are required in order to extract the data from one processor and make it available to another.

It is also the context free nature of the processor elements that permits the true sharing of the processor elements by multiple LRDs. This sharing can be as fine-grained as a single instruction cycle. No programming or special processor operations are needed to save the state of one context (assigned to one LRD), which has control of one or more processor elements, in order to permit control by another context (assigned to a second LRD). In processors which are not context free, which is the case for the prior art, specific programming and special machine operations are required in such state-saving as part of the process of context switching.

There is one additional alternative in implementing the processor elements of the present invention, which is a modification to the context free concept: an implementation which provides the physically total interconnection discussed above, but which permits, under program control, a restriction upon the transmission of generated data to the register file following completion of certain instructions.

In a fully context free implementation, at the completion of each instruction which enters the processor element, the state of the context is entirely captured in the context storage file. In the alternative case, transmission to the register file is precluded and the data is retained within the processor and made available (for example, through data chaining) to succeeding instructions which further manipulate the data. Ultimately, data is transmitted to the register file after some finite sequence of instructions completes; however, it is only the final data that is transmitted.

This can be viewed as a generalization of the case of a microcoded complex instruction as described above, and can be considered a substantially context free processor element implementation. In such an implementation, the TOLL software would be required to ensure that dependent instructions execute on the same processor element until such time as data is ultimately transmitted to the context register file. As with pipelined processor elements, this does not change the overall functionality and architecture of the TOLL software, but mainly affects the efficient scheduling of instructions among processor elements to make optimal use of each instruction cycle on all processor elements.

DETAILED DESCRIPTION
1. Detailed Description of Software

Figure 8:
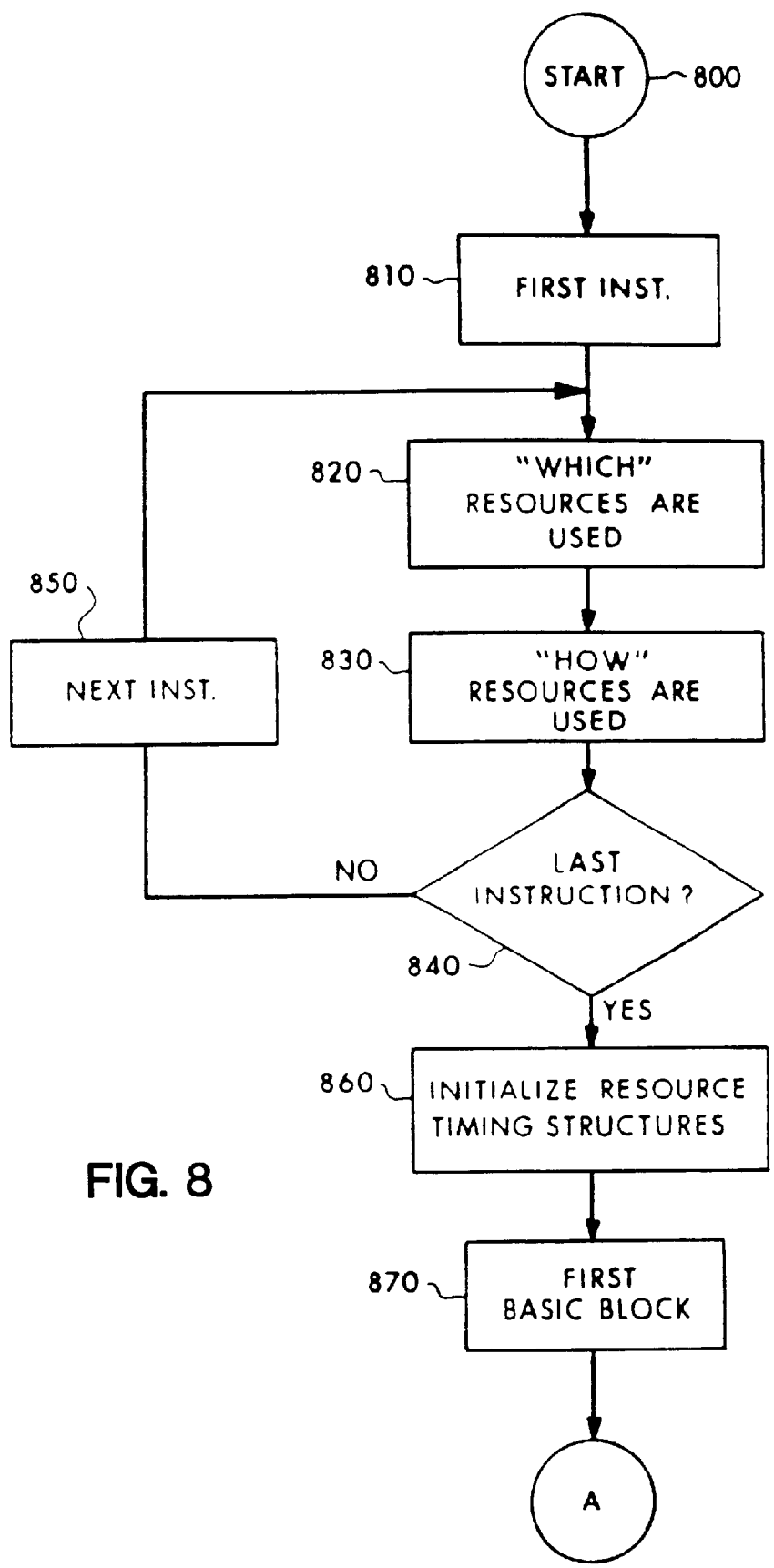
FIGS. 8–11 are the flow diagrams setting forth features of the software according to one embodiment of the present invention.

In FIGS. 8 through 11, the details of the TOLL software 110 of the present invention are set forth. Referring to FIG. 8, the conventional output from a compiler is delivered to the TOLL software at the start stage 800. The following information is contained within the conventional compiler output 800: (a) instruction functionality, (b) resources required by the instruction, (c) locations of the resources (if possible), and (d) basic block boundaries. The TOLL software then starts with the first instruction at stage 810 and proceeds to determine "which" resources are used in stage 820 and "how" the resources are used in stage 830. This process continues for each instruction within the instruction stream through stages 840 and 850 as was discussed in the previous section.

After the last instruction is processed, as tested in stage 840, a table is constructed and initialized with the "free time" and "load time" for each resource. Such a table is set forth in Table 7 for the inner loop matrix multiply example and at initialization, the table contains all zeros. The initialization occurs in stage 860 and once constructed the TOLL software proceeds to start with the first basic block in stage 870.

TABLE 7

| Resource | Load Time | Free Time |
| --- | --- | --- |
| R0 | T0 | T0 |
| R1 | T0 | T0 |
| R2 | T0 | T0 |
| R3 | T0 | T0 |
| R4 | T0 | T0 |
| R10 | T0 | T0 |
| R11 | T0 | T0 |

Figure 9:
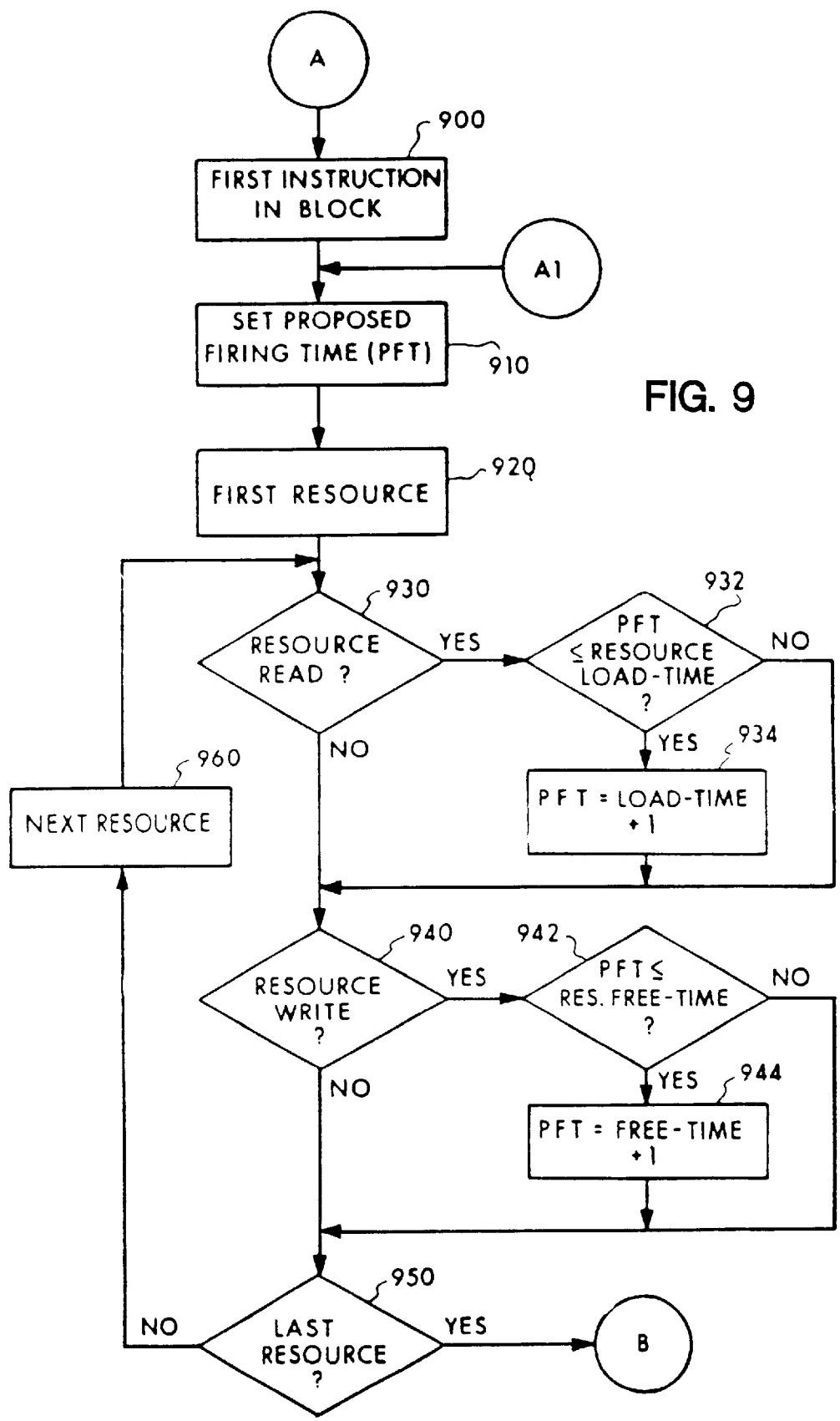

Referring to FIG. 9, the TOLL software continues the analysis of the instruction stream with the first instruction of the next basic block in stage 900. As stated previously, TOLL performs a static analysis of the instruction stream. Static analysis assumes (in effect) straight line code, that is, each instruction is analyzed as it is seen in a sequential manner. In other words, static analysis assumes that a branch is never taken. For non-pipelined instruction execution, this is not a problem, as there will never be any dependencies that arise as a result of a branch. Pipelined execution is discussed subsequently (although, it can be stated that the use of pipelining will only affect the delay value of the branch instruction).

Clearly, the assumption that a branch is never taken is incorrect. However, the impact of encountering a branch in the instruction stream is straightforward. As stated previously, each instruction is characterized by the resources (or physical hardware elements) it uses. The assignment of the firing time (and in the illustrated embodiment, the logical processor number) is dependent on how the instruction stream accesses these resources. Within this particular embodiment of the TOLL software, the usage of each resource is represented, as noted above, by data structures termed the free and load times for that resource. As each instruction is analyzed in sequence, the analysis of a branch impacts these data structures in the following manner.

When all of the instructions of a basic block have been assigned firing times, the maximum firing time of the current basic block (the one the branch is a member of) is used to update all resources load and free times (to this value). When the next basic block analysis begins, the proposed firing time is then given as the last maximum value plus one. Hence, the load and free times for each of the register resources R0 through R4, R10 and R11 are set forth below in Table 8, for the example, assuming the basic block commences with a time of T16.

TABLE 8

| Resource | Load Time | Free Time |
|----------|-----------|-----------|
| R0       | T15       | T15       |
| R1       | T15       | T15       |
| R2       | T15       | T15       |
| R3       | T15       | T15       |
| R4       | T15       | T15       |
| R10      | T15       | T15       |
| R11      | T15       | T15       |

Hence, the TOLL software sets a proposed firing time (PFT) in stage 910 to the maximum firing time plus one of the previous basic blocks firing times. In the context of the above example, the previous basic block's last firing time is T15, and the proposed firing time for the instructions in this basic block commence with T16.

In stage 920, the first resource used by the first instruction, which in this case is register R0 of instruction I0, is analyzed. In stage 930, a determination is made as to whether or not the resource is read. In the above example, for instruction I0, register R0 is not read but is written and, therefore, stage 940 is next entered to make the determination of whether or not the resource is written. In this case, instruction I0 writes into register R0 and stage 942 is entered. Stage 942 makes a determination as to whether the proposed firing time (PFT) for instruction I0 is less than or equal to the free time for the resource. In this case, referring to Table 8, the resource free time for register R0 is T15 and, therefore, the instruction proposed firing time of T16 is greater than the resource free time of T15 and the determination is "no" and stage 950 is accessed.

The analysis by the TOLL software proceeds to the next resource which in the case, for instruction I0, is register R10. This resource is both read and written by the instruction. Stage 930 is entered and a determination is made as to whether or not the instruction reads the resource. It does, so stage 932 is entered where a determination is made as to whether the current proposed firing time for the instruction (T16) is less than the resource load time (T15). It is not, so stage 940 is entered. Here a determination is made as to whether the instruction writes the resource. It does; so stage 942 is entered. In this stage a determination is made as to whether the proposed firing time for the instruction (T16) is less than the free time for the resource (T15). It is not, and stage 950 is accessed. The analysis by the TOLL software proceeds either to the next resource (there is none for instruction I0) or to "B" (FIG. 10) if the last resource for the instruction has been processed.

Figure 10:
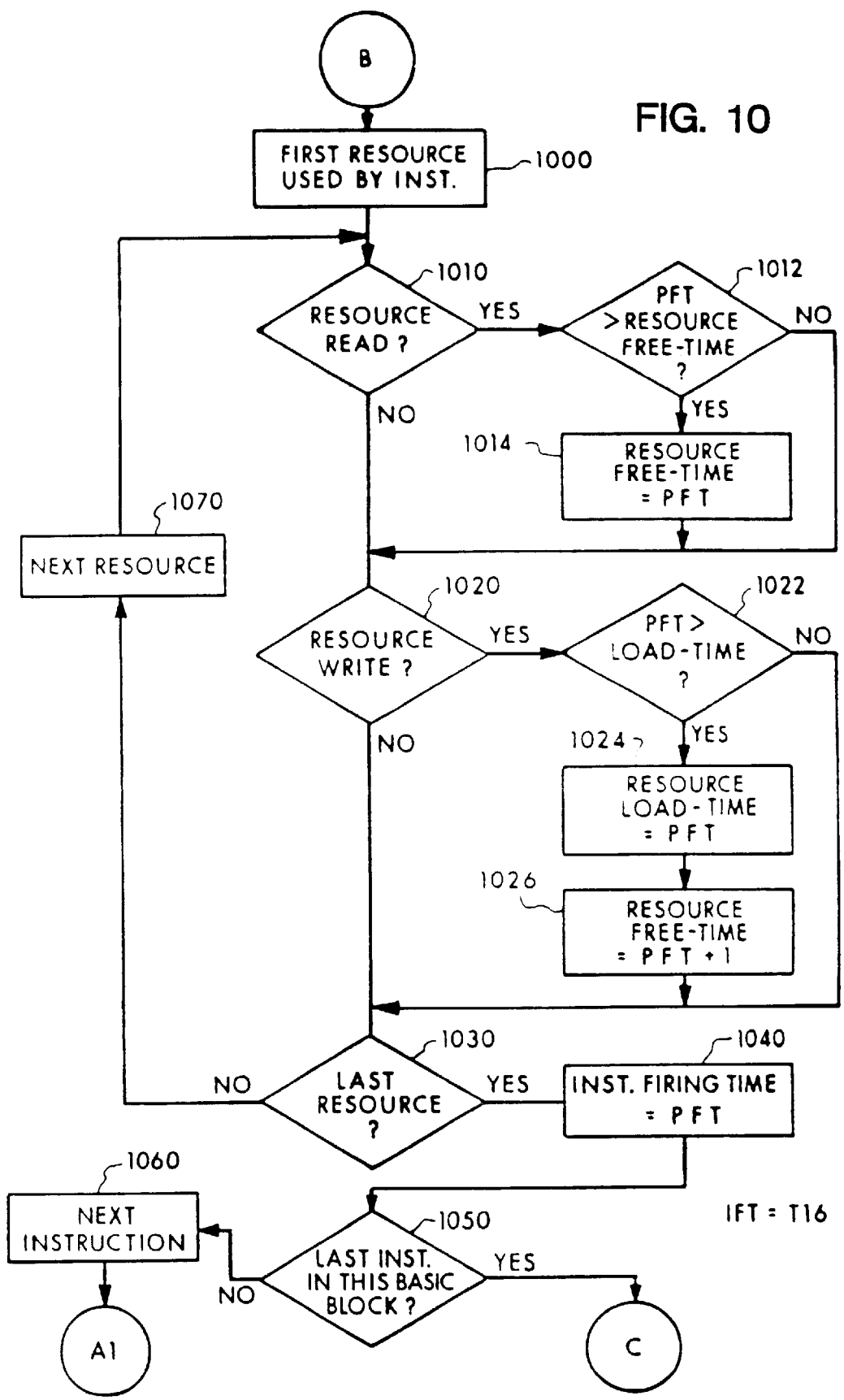

Hence, the answer to the determination at stage 950 is affirmative and the analysis then proceeds to FIG. 10. In FIG. 10, the resource free and load times will be set. At stage 1000, the first resource for instruction I0 is register R0. The first determination in stage 1010 is whether or not the instruction reads the resource. As before, register R0 in instruction I0 is not read but written and the answer to this determination is "no" in which case the analysis then proceeds to stage 1020. In stage 1020, the answer to the determination as to whether or not the resource is written is "yes" and the analysis proceeds to stage 1022. Stage 1022 makes the determination as to whether or not the proposed firing time for the instruction is greater than the resource load time. In the example, the proposed firing time is T16 and, with reference back to Table 8, the firing time T16 is greater than the load time T15 for register R0. Hence, the response to this determination is "yes" and stage 1024 is entered. In stage 1024, the resource load time is set equal to the instruction's proposed firing time and the table of resources (Table 8) is updated to reflect that change. Likewise, stage 1026 is entered and the resource free-time is updated and set equal to the instruction's proposed firing time plus one or T17 (T16 plus one).

Stage 1030 is then entered and a determination made as to whether there are any further resources used by this instruction. There is one, register R10, and the analysis processes this resource. The next resource is acquired at stage 1070. Stage 1010 is then entered where a determination is made as to whether or not the resource is read by the instruction. It is and so stage 1012 is entered where a determination is made as to whether the current proposed firing time (T16) is greater than the resource's free-time (T15). It is, and therefore stage 1014 is entered where the resource's free-time is updated to reflect the use of this resource by this instruction. The method next checks at stage 1020 whether the resource is written by the instruction. It is, and so stage 1022 is entered where a determination is made as to whether or not the current proposed firing time (T16) is greater than the load time of the resource (T15). It is, so stage 1024 is entered. In this stage, the resource's load-time is updated to reflect the firing time of the instruction, that is, the load-time is set to T16. Stage 1026 is then entered where the resource's free-time is updated to reflect the execution of the instruction, that is, the free-time is set to T17. Stage 1030 is then entered where a determination is made as to whether or not this is the last resource used by the instruction. It is, and therefore, stage 1040 is entered. The instruction firing time (IFT) is now set to equal the proposed firing time (PFT) of T16. Stage 1050 is then accessed which makes a determination as to whether or not this is the last instruction in the basic block, which in this case is "no"; and stage 1060 is entered to proceed to the next instruction, I1, which enters the analysis stage at "A1" of FIG. 9.

The next instruction in the example is I1 and the identical analysis is had for instruction I1 for registers R1 and R11 as presented for instruction I0 with registers R0 and R10. In Table 9 below, a portion of the resource Table 8 is modified to reflect these changes. (Instructions I0 and I1 have been fully processed by the TOLL software.)

TABLE 9

| Resource | Load Time | Free Time |
|----------|-----------|-----------|
| R0  | T16 | T17 |
| R1  | T16 | T17 |
| R10 | T16 | T17 |
| R11 | T16 | T17 |

The next instruction in the basic block example is instruction I2 which involves a read of registers R0 and R1 and a write into register R2. Hence, in stage 910 of FIG. 9, the proposed firing time for the instruction is set to T16 (T15 plus 1). Stage 920 is then entered and the first resource in instruction I2 is register R0. The first determination made in stage 930 is "yes" and stage 932 is entered. At stage 932, a determination is made whether the instruction's proposed firing time of T16 is less than or equal to the resource register R0 load time of T16. It is important to note that the resource load time for register R0 was updated during the analysis of register R0 for instruction I0 from time T15 to time T16. The answer to this determination in stage 932 is that the proposed firing time equals the resource load time (T16 equals T16) and stage 934 is entered. In stage 934, the instruction proposed firing time is updated to equal the resource load time plus one or, in this case, T17 (T16 plus one). The instruction I2 proposed firing time is now updated to T17. Now stage 940 is entered and since instruction I2 does not write resource R0, the answer to the determination is "no" and stage 950 and then stage 960 are entered to process the next resource which in this case is register R1.

Stage 960 initiates the analysis to take place for register R1 and a determination is made in stage 930 whether or not the resource is read. The answer, of course, is "yes" and stage 932 is entered. This time the instruction proposed firing time is T17 and a determination is made whether or not the instruction proposed firing time of T17 is less than or equal to the resource load time for register R1 which is T16. Since the instruction proposed firing time is greater than the register load time (T17 is greater than T16), the answer to this determination is "no" and stage 940. The register is not written by this instruction and, therefore, the analysis proceeds to stage 950. The next resource to be processed for instruction I2, in stage 960, is resource register R2.

The first determination of stage 930 is whether or not this resource R2 is read. It is not and hence the analysis moves to stage 940 and then to stage 942. At this point in time the instruction I2 proposed firing time is T17 and in stage 942 a determination is made whether or not the instruction's proposed firing time of T17 is less than or equal to resources, R2 free time which in Table 8 above is T15. The answer to this determination is "no" and therefore stage 950 is entered. This is the last resource processed for this instruction and the analysis continues in FIG. 10.

Referring to FIG. 10, the first resource R0 for instruction I2 is analyzed. In stage 1010, the determination is made whether or not this resource is read and the answer is "yes." Stage 1012 is then entered to make the determination whether the proposed firing time T17 of instruction I2 is greater than the resource free-time for register R0. In Table 9, the free-time for register R0 is T17 and the answer to the determination is "no" since both are equal. Stage 1020 is then entered which also results in a "no" answer transferring the analysis to stage 1030. Since this is not the last resource to be processed for instruction I2, stage 1070 is entered to advance the analysis to the next resource register R1. Precisely the same path through FIG. 10 occurs for register R1 as for register R0. Next, stage 1070 initiates processing of register R2. In this case, the answer to the determination at stage 1010 is "no" and stage 1020 is accessed. Since register R2 for instruction I2 is written, stage 1022 is accessed. In this case, the proposed firing time of instruction I2 is T17 and the resource load-time is T15 from Table 8. Hence, the proposed firing time is greater than the load time and stage 1024 is accessed. Stages 1024 and 1026 cause the load time and the free time for register R2 to be advanced, respectively, to T17 and T18, and the resource table is updated as shown in FIG. 10:

TABLE 10

| Resource | Load-Time | Free-Time |
|----------|-----------|-----------|
| R0 | T16 | T17 |
| R1 | T16 | T17 |
| R2 | T17 | T18 |

As this is the last resource processed, for instruction I2, the proposed firing time of T17 becomes the actual firing time (stage 1040) and the next instruction is analyzed.

It is in this fashion that each of the instructions in the inner loop matrix multiply example are analyzed so that when fully analyzed the final resource table appears as in Table 11 below:

TABLE 11

| Resource | Load-Time | Free-Time |
|----------|-----------|-----------|
| R0  | T16 | T17 |
| R1  | T16 | T17 |
| R2  | T17 | T18 |
| R3  | T18 | T19 |
| R4  | T16 | T17 |
| R10 | T16 | T17 |
| R11 | T16 | T17 |

Figure 11:
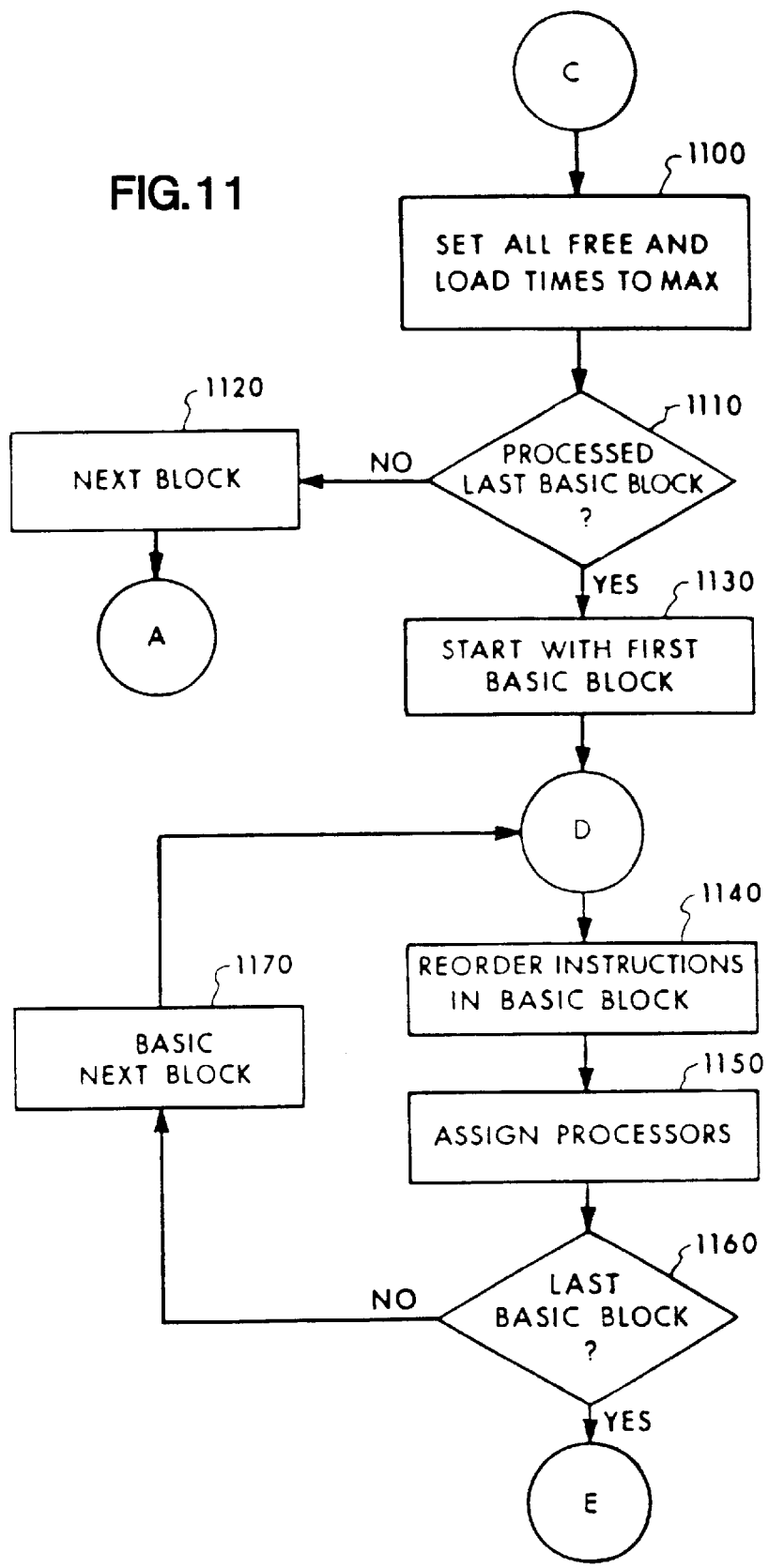

Referring to FIG. 11, the TOLL software, after performing the tasks set forth in FIGS. 9 and 10, enters stage 1100. Stage 1100 sets all resource free and load times to the maximum of those within the given basic block. For example, the maximum time set forth in Table 11 is T19 and, therefore, all free and load times are set to time T19. Stage 1110 is then entered to make the determination whether this is the last basic block to be processed. If not, stage 1120 is entered to proceed with the next basic block. If this is the last basic block, stage 1130 is entered and starts again with the first basic block in the instruction stream. The purpose of this analysis is to logically reorder the instructions within each basic block and to assign logical processor numbers to each instruction. This is summarized in Table 6 for the inner loop matrix multiply example. Stage 1140 performs the function of sorting the instruction in each basic block in ascending order using the instruction firing time (IFT) as the basis. Stage 1150 is then entered wherein the logical processor numbers (LPNs) are assigned. In making the assignment of the processor elements, the instructions of a set, that is those having the same instruction firing time (IFT), are assigned logical processor numbers on a first come, first serve basis. For example, in reference back to Table 6, the first set of instructions for firing time T16 are I0, I1, and I4. These instructions are assigned respectively to processors PE0, PE1, and PE2. Next, during time T17, the second set of instructions I2 and I5 are assigned to processors PE0 and PE1, respectively. Finally, during the final time T18, the final instruction I3 is assigned to processor PE0. It is to be expressly understood that the assignment of the processor elements could be effected using other methods and is based upon the actual architecture of the processor element and the system. As is clear, in the preferred embodiment the set of instructions are assigned to the logical processors on a first in time basis. After making the assignment, stage 1160 is entered to determine whether or not the last basic block has been processed and if not, stage 1170 brings forth the next basic block and the process is repeated until finished.

Hence, the output of the TOLL software, in this illustrated embodiment, results in the assignment of the instruction firing time (IFT) for each of the instructions as shown in FIG. 4. As previously discussed, the instructions are reordered, based upon the natural concurrencies appearing in the instruction stream, according to the instruction firing times; and, then, individual logical processors are assigned as shown in Table 6. While the discussion above has concentrated on the inner loop matrix multiply example, the analysis set forth in FIGS. 9 through 11 can be applied to any SESE basic block (BB) to detect the natural concurrencies contained therein and then to assign the instruction firing times (IFTs) and the logical processor numbers (LPNs) for each user's program. This intelligence can then be added to the reordered instructions within the basic block. This is only done once for a given program and provides the necessary time-driven decentralized control and processor mapping information to run on the TDA system architecture of the present invention.

Figure 12:
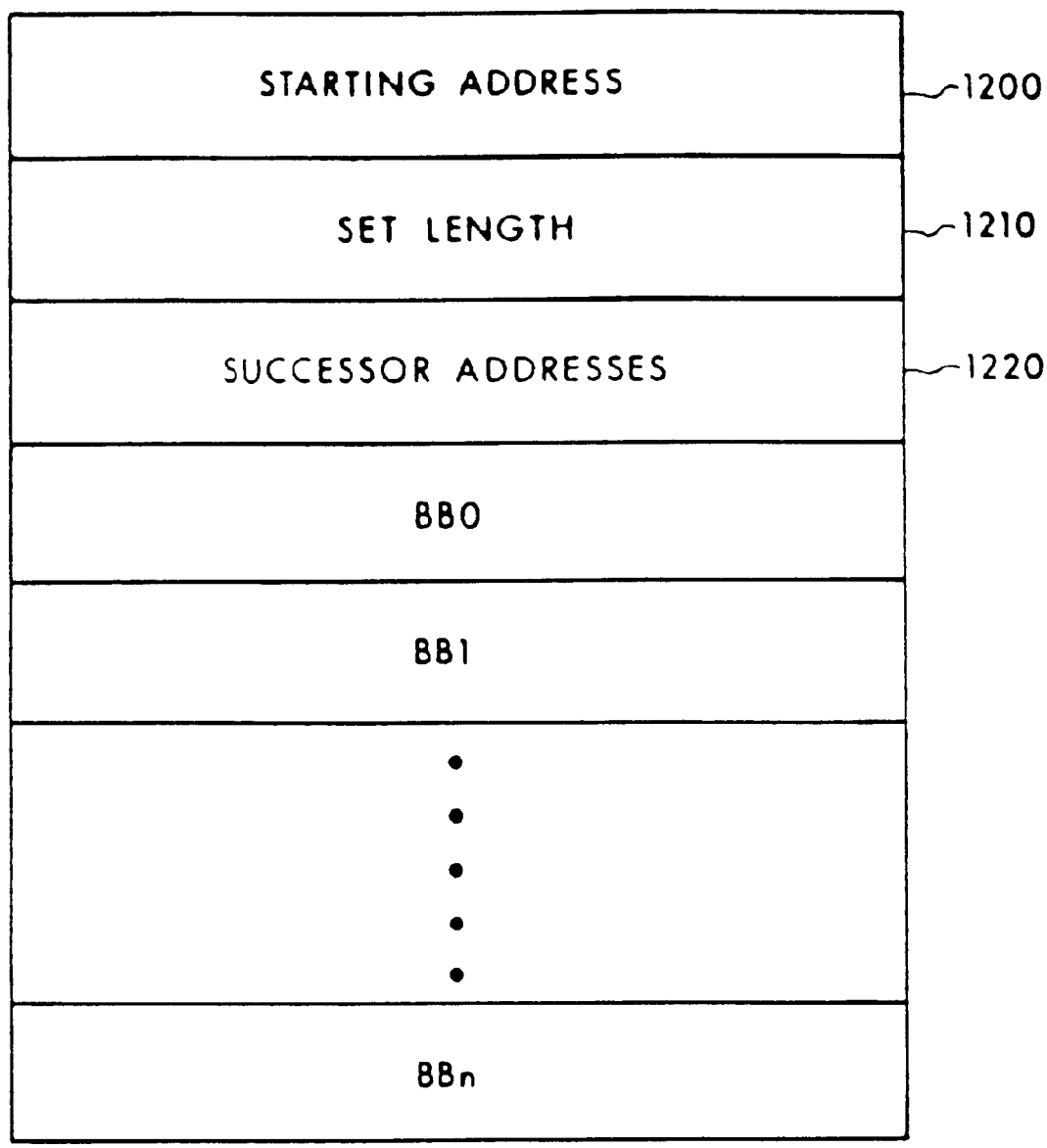
FIG. 12 is a diagram describing one preferred form of the execution sets in the TOLL software.

The purpose of the execution sets, referring to FIG. 12, is to optimize program execution by maximizing instruction cache hits within an execution set or, in other words, to statically minimize transfers by a basic block within an execution set to a basic block in another execution set. Support of execution sets consists of three major components: data structure definitions, pre-execution time software which prepares the execution set data structures, and hardware to support the fetching and manipulation of execution sets in the process of executing the program.

The execution set data structure consists of a set of one or more basic blocks and an attached header. The header contains the following information: the address 1200 of the start of the actual instructions (this is implicit if the header has a fixed length), the length 1210 of the execution set (or the address of the end of the execution set), and zero or more addresses 1220 of potential successor (in terms of program execution) execution sets.

The software required to support execution sets manipulates the output of the post-compile processing. That processing performs dependency analysis, resource analysis, resource assignment, and individual instruction stream reordering. The formation of execution sets uses one or more algorithms for determining the probable order and frequency of execution of the basic blocks. The basic blocks are grouped accordingly. The possible algorithms are similar to the algorithms used in solving linear programming problems for least-cost routing. In the case of execution sets, cost is associated with branching. Branching between basic blocks contained in the same execution set incurs no penalty with respect to cache operations because it is assumed that the instructions for the basic blocks of an execution set are resident in the cache in the steady state. Cost is then associated with branching between basic blocks of different execution sets, because the instructions of the basic blocks of a different execution set are assumed not to be in cache. Cache misses delay program execution while the retrieval and storage of the appropriate block from main memory to cache is made.

There are several possible algorithms which can be used to assess and assign costs under the teaching of the present invention. One algorithm is the static branch cost approach. In accordance with this method, one begins by placing basic blocks into execution sets based on block contiguity and a maximum allowable execution set size (this would be an implementation limit, such as maximum instruction cache size). The information about branching between basic blocks is known and is an output of the compiler. Using this information, the apparatus calculates the "cost" of the resulting grouping of basic blocks into execution sets based on the number of (static) branches between basic blocks in different execution sets. The apparatus can then use standard linear programming techniques to minimize this cost function, thereby obtaining the "optimal" grouping of basic blocks into execution sets. This algorithm has the advantage of ease of implementation; however, it ignores the actual dynamic branching patterns which occur during actual program execution.

Other algorithms could be used in accordance with the teachings of the present invention which provide a better estimation of actual dynamic branch patterns. One example would be the collection of actual branch data from a program execution, and the resultant re-grouping of the basic blocks using a weighted assignment of branch costs based on the actual inter-block branching. Clearly, this approach is data dependent. Another approach would be to allow the programmer to specify branch probabilities, after which the weighted cost assignment would be made. This approach has the disadvantages of programmer intervention and programmer error. Still other approaches would be based using parameters, such as limiting the number of basic blocks per execution set, and applying heuristics to these parameters.

The algorithms described above are not unique to the problem of creating execution sets. However, the use of execution sets as a means of optimizing instruction cache performance is novel. Like the novelty of pre-execution time assignment of processor resources, the pre-execution time grouping of basic blocks for maximizing cache performance is not found in prior art.

The final element required to support the execution sets is the hardware. As will be discussed subsequently, this hardware includes storage to contain the current execution set starting and ending addresses and to contain the other execution set header data. The existence of execution sets and the associated header data structures are, in fact, transparent to the actual instruction fetching from cache to the processor elements. The latter depends strictly upon the individual instruction and branch addresses. The execution set hardware operates independently of instruction fetching to control the movement of instruction words from main memory to the instruction cache. This hardware is responsible for fetching basic blocks of instructions into the cache until either the entire execution set resides in cache or program execution has reached a point that a branch has occurred to a basic block outside the execution set. At this point, since the target execution set is not resident in cache, the execution set hardware begins fetching the basic blocks belonging to the target execution set.

Figure 13:
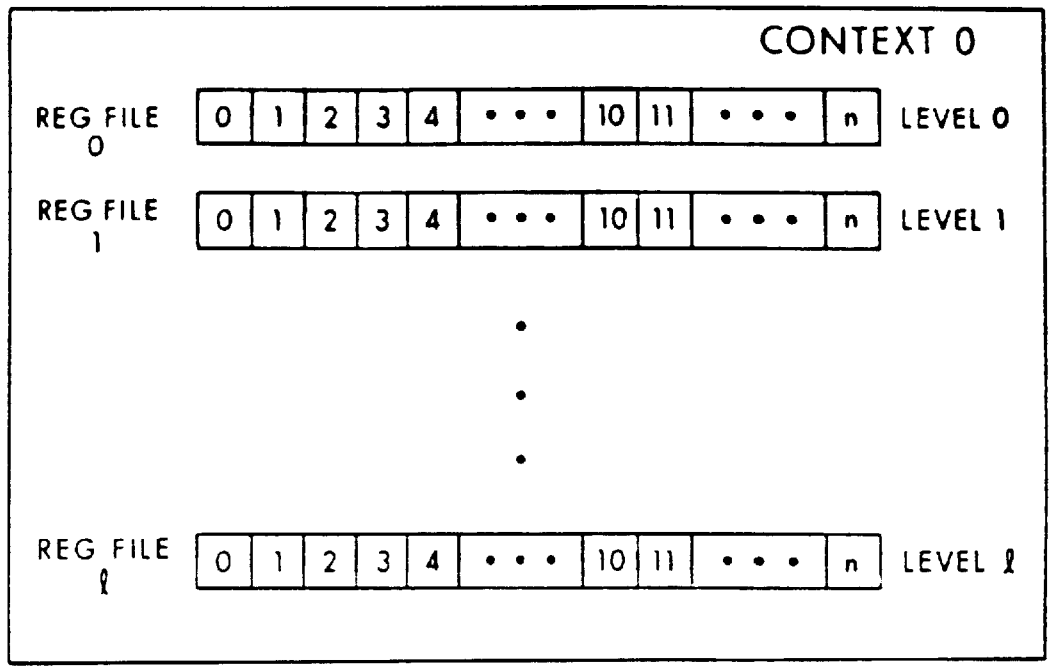
FIG. 13 sets forth the register file organization according to a preferred embodiment of the present invention.

Referring to FIG. 13, the structure of the register set file 660 for context file zero (the structure being the same for each context file) has L+1 levels of register sets with each register set containing n+1 separate registers. For example, n could equal 31 for a total of 32 registers. Likewise, the L could equal 15 for a total of 16 levels. Note that these registers are not shared between levels; that is, each level has a set of registers which is physically distinct from the registers of each other level.

Each level of registers corresponds to that group of registers available to a subroutine executing at a particular depth relative to the main program. For example, the set of registers at level zero can be available to the main program; the set of registers at level one can be available to a first level subroutine that is called directly from the main program; the set of registers at level two can be available to any subroutine (a second level subroutine) called directly by a first level subroutine; the set of registers at level three can be available to any subroutine called directly by a second level subroutine; and so on.

As these sets of registers are independent, the maximum number of levels corresponds to the number of subroutines that can be nested before having to physically share any registers between subroutines, that is, before having to store the contents of any registers in main memory. The register sets, in their different levels, constitute a shared resource of the present invention and significantly saves system overhead during subroutine calls since only rarely do sets of registers need to be stored, for example in a stack, in memory.

Communication between different levels of subroutines takes place, in the preferred illustrated embodiment, by allowing each subroutine up to three possible levels from which to obtain a register: the current level, the previous (calling) level (if any) and the global (main program) level. The designation of which level of registers is to be accessed, that is, the level relative to the presently executing main program or subroutine, uses the static SCSM information attached to the instruction by the TOLL software. This information designates a level relative to the instruction to be processed. This can be illustrated by a subroutine call for a SINE function that takes as its argument a value representing an angular measure and returns the trigonometric SINE of that measure. The main program is set forth in Table 12; and the subroutine is set forth in Table 13.

TABLE 12

| Main Program | Purpose |
|---|---|
| LOAD X, R1 | Load X from memory into Reg R1 for parameter passing |
| CALL SINE | Subroutine Call - Returns result in Reg R2 |
| LOAD R2, R3 | Temporarily save results in Reg R3 |
| LOAD Y, R1 | Load Y from memory into Reg R1 for parameter passing |
| CALL SINE | Subroutine Call - Returns result in Reg R2 |
| MULT R2, R3, R4 | Multiply Sin (x) with Sin (y) and store result in Reg R4 |
| STORE R4, Z | Store final result in memory at Z |

The SINE subroutine is set forth in Table 13:

TABLE 13

| Instruction | Subroutine | Purpose |
|---|---|---|
| I0 | Load R1 (L0), R2 | Load Reg R2, level 1 with contents of Reg R1, level 0 |
| Ip-1 | (Perform SINE), R7 | Calculate SINE function and store result in Reg R7, level 1 |
| Ip | Load R7, R2 (L0) | Load Reg R2, level 0 with contents of Reg R7, level 1 |

Figure 14:
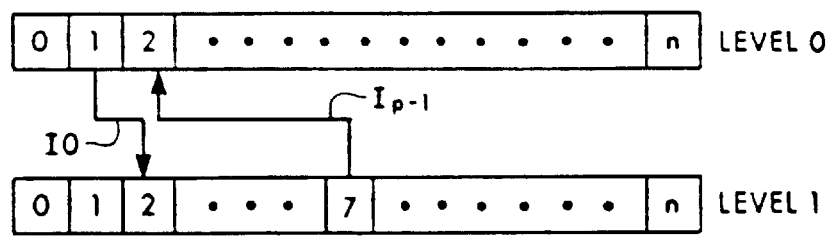
FIG. 14 illustrates a transfer between registers in different levels during a subroutine call.

Hence, under the teachings of the present invention and with reference to FIG. 14, instruction I0 of the subroutine loads register R2 of the current level (the subroutine's level or called level) with the contents of register R1 from the previous level (the calling routine or level). Note that the subroutine has a full set of registers with which to perform the processing independent of the register set of the calling routine. Upon completion of the subroutine call, instruction Ip causes register R7 of the current level to be stored in register R2 of the calling routine's level (which returns the results of the SINE routine back to the calling program's register set).

As described in more detail in connection with FIG. 22, the transfer between the levels occurs through the use of the SCSM dynamically generated information which can contain the absolute value of the current procedural level of the instruction (that is, the level of the called routine), the previous procedural level (that is, the level of the calling routine) and the context identifier. The absolute dynamic SCSM level information is generated by the LRD from the relative (static) SCSM information provided by the TOLL software. The context identifier is only used when processing a number of programs in a multi-user system. The relative SCSM information is shown in Table 13 for register R1 (of the calling routine) as R1(L0) and for register R2 as R2(L0). All registers of the current level have appended an implied (00) signifying the current procedural level.

This method and structure described in connection with FIGS. 13 and 14 differ substantially from prior art approaches where physical sharing of the same registers occurs between registers of a subroutine and its calling routine. By thereby limiting the number of registers that are available for use by the subroutine, more system overhead for storing the registers in main memory is required. See, for example, the MIPS approach as set forth in "Reduced Instruction Set Computers" David A. Patterson, Communications of the ACM, January, 1985, Vol. 28, No. 1, Pgs. 8–21) In that reference, the first sixteen registers are local registers to be used solely by the subroutine, the next eight registers, registers 16 through 23, are shared between the calling routine and the subroutine, and final eight registers, registers 24 through 31 are shared between the global (or main) program and the subroutine. Clearly, out of 32 registers that are accessible by the subroutine, only 16 are dedicated solely for use by the subroutine in the processing of its program. In the processing of complex subroutines, the limited number of registers that are dedicated solely to the subroutine may not (in general) be sufficient for the processing of the subroutine. Data shuffling (entailing the storing of intermediate data in memory) must then occur, resulting in significant overhead in the processing of the routine.

Under the teachings of the present invention, the relative transfers between the levels which are known to occur at compile time are specified by adding the requisite information to the register identifiers as shown in FIG. 4 (the SCSM data), to appropriately map the instructions between the various levels. Hence, a completely independent set of registers is available to the calling routine and to each level of subroutine. The calling routine, in addition to accessing its own complete set of registers, can also gain direct access to a higher set of registers using the aforesaid static SCSM mapping code which is added to the instruction, as previously described. There is literally no reduction in the size of the register set available to a subroutine as specifically found in prior art approaches. Furthermore, the mapping code for the SCSM information can be a field of sufficient length to access any number of desired levels. For example, in one illustrated embodiment, a calling routine can access up to seven higher levels in addition to its own registers with a field of three bits. The present invention is not to be limited to any particular number of levels nor to any particular number of registers within a level. Under the teachings of the present invention, the mapping shown in FIG. 14 is a logical mapping and not a conventional physical mapping. For example, three levels, such as the calling routine level, the called level, and the global level require three bit maps. The relative identification of the levels can be specified by a two bit word in the static SCSM, for example, the calling routine by (00), the subordinate level by (01), and the global level by (11). Thus, each user's program is analyzed and the static SCSM relative procedural level information, also designated a window code, is added to the instructions prior to the issuance of the user program to a specific LRD. Once the user is assigned to a specific LRD, the static SCSM level informatin is used to generate the LRD dependent and dynamic SCSM information which is added as it is needed.

2. Detailed Description of the Hardware

As shown in FIG. 6, the TDA system 600 of the present invention is composed of memory 610, logical resource drivers (LRD) 620, processor elements (PEs) 640, and shared context storage files 660. The following detailed description starts with the logical resource drivers since the TOLL software output is loaded into this hardware.

a. Logical Resource Drivers (LRDS)

Figure 15:
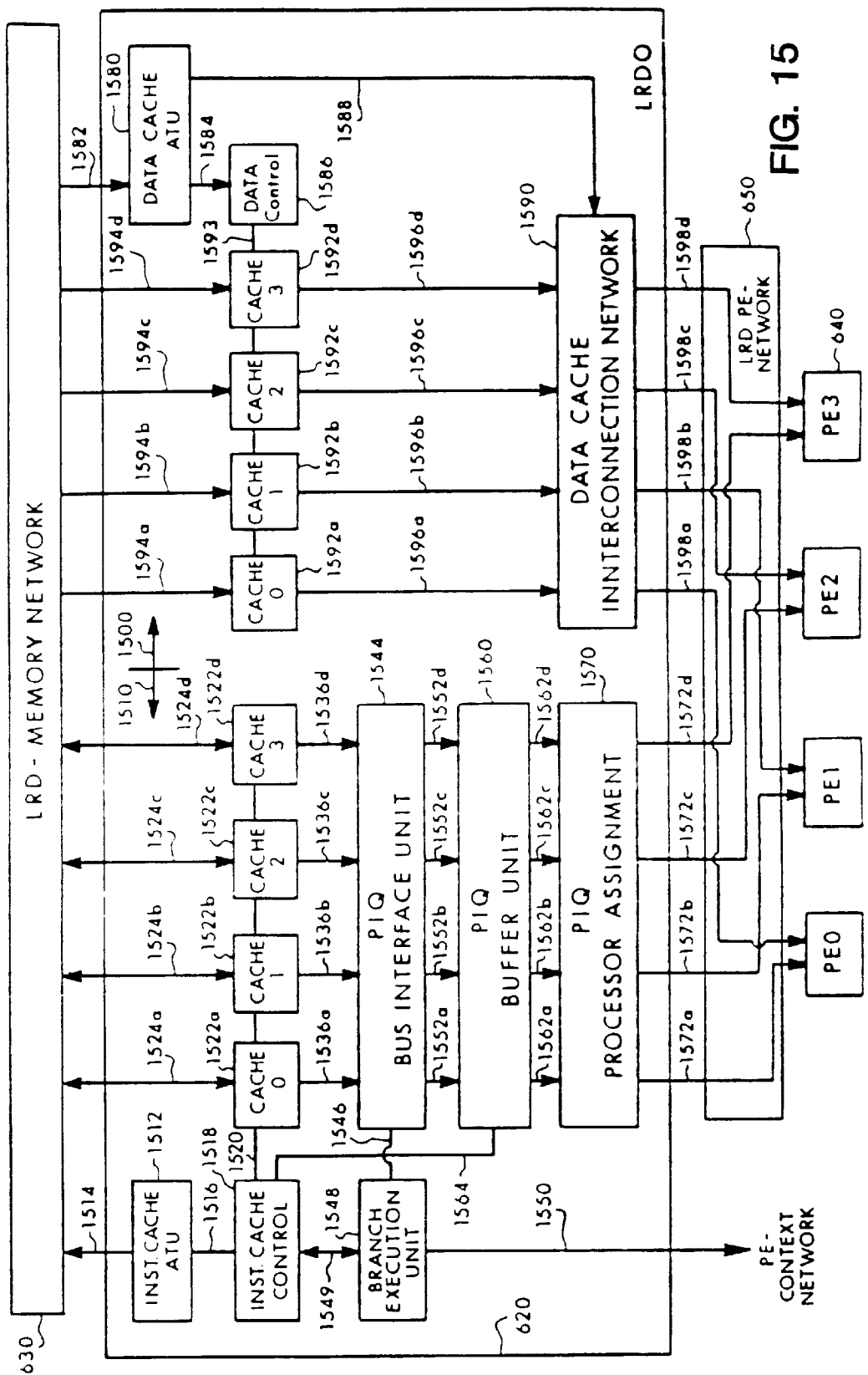
FIG. 15 sets forth the structure of a logical resource driver (LRD) according to a preferred embodiment of the present invention.

The details of a particular logical resource driver (LRD) is set forth in FIG. 15. As shown in FIG. 6, each logical resource driver 620 is interconnected to the LRD-memory network 630 on one side and to the processor elements 640 through the PE-LRD network 650 on the other side. If the present invention were a SIMD machine, then only one LRD is provided and only one context file is provided. For MIMD capabilities, one LRD and one context file is provided for each user so that, in the embodiment illustrated in FIG. 6, up to "n" users can be accommodated.

The logical resource driver 620 is composed of a data cache section 1500 and an instruction selection section 1510. In the instruction selection section, the following components are interconnected. An instruction cache address translation unit (ATU) 1512 is interconnected to the LRD-memory network 630 over a bus 1514. The instruction cache ATU 1512 is further interconnected over a bus 1516 to an instruction cache control circuit 1518. The instruction cache control circuit 1518 is interconnected over lines 1520 to a series of cache partitions 1522a, 1522b, 1522c, and 1522d. Each of the cache partitions is respectively connected over busses 1524a, 1524b, 1524c, and 1524d to the LRD-memory network 630. Each cache partition circuit is further interconnected over lines 1536a, 1536b, 1536c, and 1536d to a processor instruction queue (PIQ) bus interface unit 1544. The PIQ bus interface unit 1544 is connected over lines 1546 to a branch execution unit (BEU) 1548 which in turn is connected over lines 1550 to the PE-context file network 670. The PIQ bus interface unit 1544 is further connected over lines 1552a, 1552b, 1552c, and 1552d to a processor instruction queue (PIQ) buffer unit 1560 which in turn is connected over lines 1562a, 1562b, 1562c, and 1562d to a processor instruction queue (PIQ) processor assignment circuit 1570. The PIQ processor assignment circuit 1570 is in turn connected over lines 1572a, 1572b, 1572c, and 1572d to the PE-LRD network 650 and hence to the processor elements 640.

On the data cache portion 1500, a data cache ATU 1580 is interconnected over bus 1582 to the LRD-memory network 630 and is further interconnected over bus 1584 to a data cache control circuit 1586 and over lines 1588 to a data cache interconnection network 1590. The data cache control 1586 is also interconnected to data cache partition circuits 1592a, 1592b, 1592c and 1592d over lines 1593. The data cache partition circuits, in turn, are interconnected over lines 1594a, 1594b, 1594c, and 1594d to the LRD-memory network 630. Furthermore, the data cache partition circuits 1592 are interconnected over lines 1596a, 1596b, 1596c, and 1596d to the data cache interconnection network 1590. Finally, the data cache interconnection network 1590 is interconnected over lines 1598a, 1598b, 1598c, and 1598d to the PE-LRD network 650 and hence to the processor elements 640.

In operation, each logical resource driver (LRD) 620 has two sections, the data cache portion 1500 and the instruction selection portion 1510. The data cache portion 1500 acts as a high speed data buffer between the processor elements 640 and memory 610. Note that due to the number of memory requests that must be satisfied per unit time, the data cache 1500 is interleaved. All data requests made to memory by a processor element 640 are issued on the data cache interconnection network 1590 and intercepted by the data cache 1592. The requests are routed to the appropriate data cache 1592 by the data cache interconnection network 1590 using the context identifier that is part of the dynamic SCSM information attached by the LRD to each instruction that is executed by the processors. The address of the desired datum determines in which cache partition the datum resides. If the requested datum is present (that is, a data cache hit occurs), the datum is sent back to the requesting processor element 640.

If the requested datum is not present in data cache, the address delivered to the cache 1592 is sent to the data cache ATU 1580 to be translated into a system address. The system address is then issued to memory. In response, a block of data from memory (a cache line or block) is delivered into the cache partition circuits 1592 under control of data cache control 1586. The requested data, that is resident in this cache block, is then sent through the data cache interconnection network 1590 to the requesting processor element 640. It is to be expressly understood that this is only one possible design. The data cache portion is of conventional design and many possible implementations are realizable to one skilled in the art. As the data cache is of standard functionality and design, it will not be discussed further.

The instruction selection portion 1510 of the LRD has three major functions; instruction caching, instruction queueing and branch execution. The system function of the instruction cache portion of selection portion 1510 is typical of any instruction caching mechanism. It acts as a high speed instruction buffer between the processors and memory.

However, the current invention presents methods and an apparatus configuration for realizing this function that are unique.

One purpose of the instruction portion 1510 is to receive execution sets from memory, place the sets into the caches 1522 and furnish the instructions within the sets, on an as needed basis, to the processor elements 640. As the system contains multiple, generally independent, processor elements 640, requests to the instruction cache are for a group of concurrently executable instructions. Again, due to the number of requests that must be satisfied per unit time, the instruction cache is interleaved. The group size ranges from none to the number of processors available to the users. The groups are termed packets, although this does not necessarily imply that the instructions are stored in a contiguous manner. Instructions are fetched from the cache on the basis of their instruction firing time (IFT). The next instruction firing time register contains the firing time of the next packet of instructions to be fetched. This register may be loaded by the branch execution unit 1548 of the LRD as well as incremented by the cache control unit 1518 when an instruction fetch has been completed.

Figure 16:
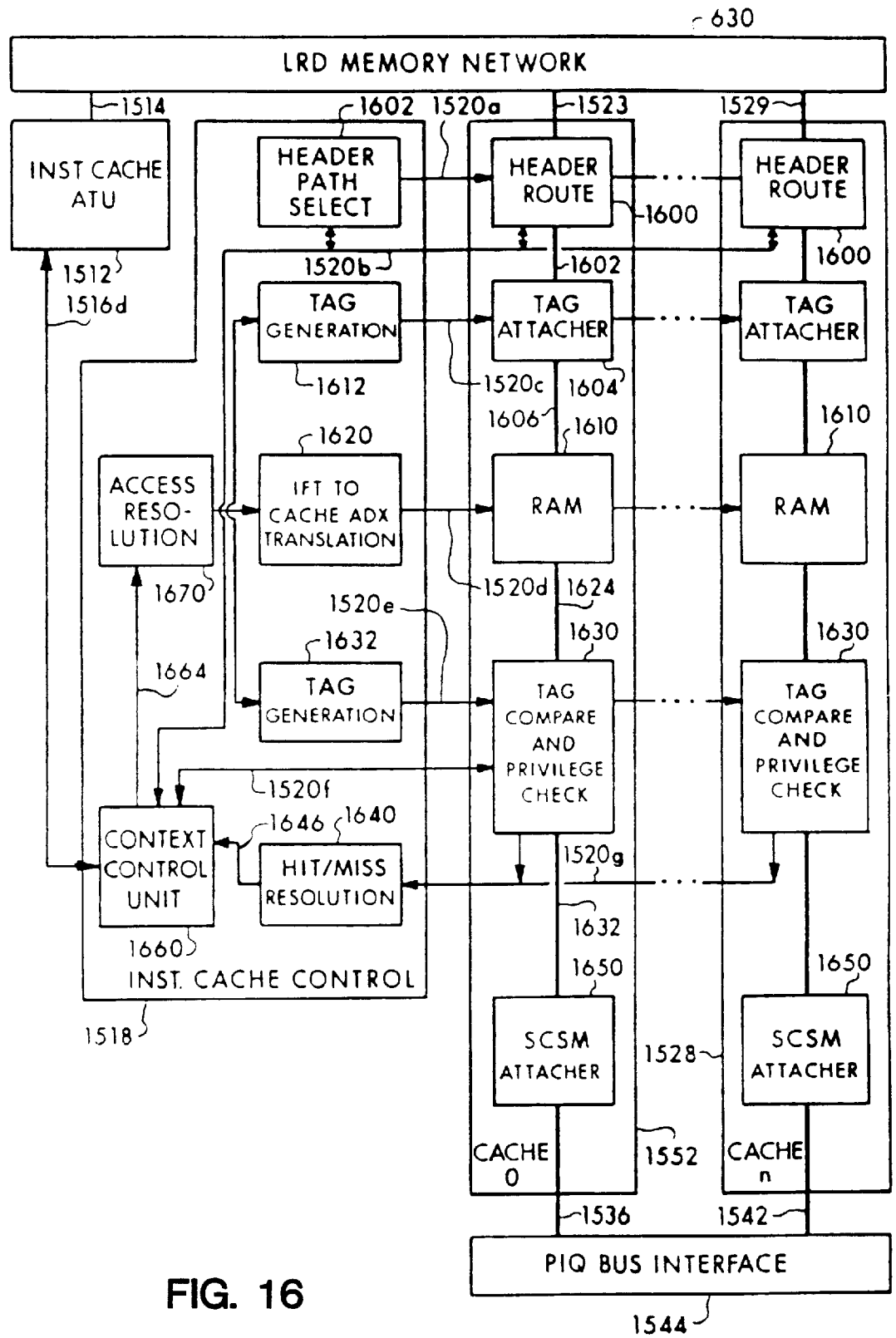
FIG. 16 sets forth the structure of an instruction cache control and of the caches according to a preferred embodiment of the present invention.

The next IFT register (NIFTR) is a storage register that is accessible from the context control unit 1518 and the branch execution unit 1548. Due to its simple functionality, it is not explicitly shown. Technically, it is a part of the instruction cache control unit 1518, and is further buried in the control unit 1660 (FIG. 16). The key point here is that the NIFTR is merely a storage register which can be incremented or loaded.

The instruction cache selection portion 1510 receives the instructions of an execution set from memory over bus 1524 and, in a round robin manner, places instructions word into each cache partitions, 1522a, 1522b, 1522c and 1522d. In other words, the instructions in the execution set are directed so that the first instruction is delivered to cache partition 1522a, the second instruction to cache partition 1522b, the third instruction to cache partition 1522c, and the fourth instruction to cache partition 1522d. The fifth instruction is then directed to cache partition 1522a, and so on until all of the instructions in the execution set are delivered into the cache partition circuits.

All the data delivered to the cache partitions are not necessarily stored in the cache. As will be discussed, the execution set header and trailer may not be stored. Each cache partition attaches a unique identifier (termed a tag) to all the information that is to be stored in that cache partition. The identifier is used to verify that information obtained from the cache is indeed the information desired.

When a packet of instructions is requested, each cache partition determines if the partition contains an instruction that is a member of the requested packet. If none of the partitions contain an instruction that is a member of the requested packet (that is, a miss occurs), the execution set that contains the requested packet is requested from memory in a manner analogous to a data cache miss.

If a hit occurs (that is, at least one of the partitions 1522 contains an instruction from the requested packet), the partition(s) attach any appropriate dynamic SCSM information to the instruction(s). The dynamic SCSM information, which can be attached to each instruction, is important for multi-user applications. The dynamically attached SCSM information identifies the context file (see FIG. 6) assigned to a given user. Hence, under the teachings of the present invention, the system 600 is capable of delay free switching among many user context files without requiring a master processor or access to memory.

The instruction(s) are then delivered to the PrQ bus interface unit 1544 of the LRD 620 where it is routed to the appropriate PIQ buffers 1560 according to the logical processor number (LPN) contained in the extended intelligence that the TOLL software, in the illustrated embodiment, has attached to the instruction. The instructions in the PIQ buffer unit 1560 are buffered for assignment to the actual processor elements 640. The processor assignment is performed by the PIQ processor assignment unit 1570. The assignment of the physical processor elements is performed on the basis of the number of processor elements currently available and the number of instructions that are available to be assigned. These numbers are dynamic. The selection process is set forth below.

The details of the instruction cache control 1518 and of each cache partition 1522 of FIG. 15 are set forth in FIG. 16. In each cache partition circuit 1522, five circuits are utilized. The first circuit is the header route circuit 1600 which routes an individual word in the header of the execution set over a path 1520b to the instruction cache context control unit 1660. The control of the header route circuit 1600 is effected over path 1520a by the header path select circuit 1602. The header path select circuit 1602 based upon the address received over lines 1520b from the control unit 1660 selectively activates the required number of header routers 1600 in the cache partitions. For example, if the execution set has two header words, only the first two header route circuits 1600 are activated by the header path select circuit 1602 and therefore two words of header information are delivered over bus 1520b to the control unit 1660 from the two activated header route circuits 1600 of cache partition circuits 1522a and 1522b (not shown). As mentioned, successive words in the execution set are delivered to successive cache partition circuits 1522.

For example, assume that the data of Table 1 represents an entire execution set and that appropriate header words appear at the beginning of the execution set. The instructions with the earliest instruction firing times (IFTs) are listed first and for a given IFT, those instructions with the lowest logical processor number are listed first. The table reads:

TABLE 14

| Header Word 1 |
| --- |
| Header Word 2 |
| I0 (T16) (PE0) |
| I1 (T16) (PE1) |
| I4 (T16) (PE2) |
| I2 (T17) (PE0) |
| I5 (T17) (PE1) |
| I3 (T18) (PE0) |

Hence, the example of Table 1 (that is, the matrix multiply inner loop), now has associated with it two header words and the extended information defining the firing time (IFT) and the logical processor number (LPN). As shown in Table 14, the instructions were reordered by the TOLL software according to the firing times. Hence, as the execution set shown in Table 14 is delivered through the LRD-memory network 630 from memory, the first word (Header Word 1) is routed by partition CACHE0 to the control unit 1660. The second word (Header Word 2) is routed by partition CACHE1 (FIG. 15) to the control unit 1660. Instruction I0 is delivered to partition CACHE2, instruction I1 to partition CACHE3, instruction I2 to partition CACHE0, and so forth. As a result, the cache partitions 1522 now contain the instructions as shown in Table 15:

TABLE 15

| Cache0 | Cache1 | Cache2 | Cache3 |
|--------|--------|--------|--------|
|        |        | I0     | I1     |
| I4     | I2     | I5     | I3     |

It is important to clarify that the above example has only one basic block in the execution set (that is, it is a simplistic example). In actuality, an execution set would have a number of basic blocks.

The instructions are then delivered for storage into a cache random access memory (RAM) 1610 resident in each cache partition. Each instruction is delivered from the header router 1600 over a bus 1602 to the tag attacher circuit 1604 and then over a line 1606 into the RAM 1610. The tag attacher circuit 1604 is under control of a tag generation circuit 1612 and is interconnected therewith over a line 1520c. Cache RAM 1610 could be a conventional cache high speed RAM as found in conventional superminicomputers.

The tag generation circuit 1612 provides a unique identification code (ID) for attachment to each instruction before storage of that instruction in the designated RAM 1610. The assigning of process identification tags to instructions stored in cache circuits is conventional and is done to prevent aliasing of the instructions. "Cache Memories" by Alan J. Smith, ACM Computing Surveys, Vol. 14, September, 1982. The tag comprises a sufficient amount of information to uniquely identify it from each other instruction and user. The illustrated instructions already include the IFT and LPN, so that subsequently, when instructions are retrieved for execution, they can be fetched based on their firing times. As shown in Table 16, below, each instruction containing the extended information and the hardware tag is stored, as shown, for the above example:

TABLE 16

| CACHE0: | I4 (T16) (PE2) (ID2) |
|---------|----------------------|
| CACHE1: | I2 (T17) (PE0) (ID3) |
| CACHE2: | I0 (T16) (PE0) (ID0) |
|         | I5 (T17) (PE1) (ID4) |
| CACHE3: | I1 (T16) (PE1) (ID1) |
|         | I3 (T18) (PE0) (ID5) |

As stated previously, the purpose of the cache partition circuits 1522 is to provide a high speed buffer between the slow main memory 610 and the fast processor elements 640. Typically, the cache RAM 1610 is a high speed memory capable of being quickly accessed. If the RAM 1610 were a true associative memory, as can be witnessed in Table 16, each RAM 1610 could be addressed based upon instruction firing times (IFTs). At the present time, such associative memories are not economically justifiable and an IFT to cache address translation circuit 1620 must be utilized. Such a circuit is conventional in design and controls the addressing of each RAM 1610 over a bus 1520d. The purpose of circuit 1620 is to generate the RAM address of the desired instructions given the instruction firing time. Hence, for instruction firing time T16, CACHE0, CACHE2, and CACHE3, as seen in Table 16, would produce instructions I4, I0, and I1 respectively.

When the cache RAMs 1610 are addressed, those instructions associated with a specific firing time are delivered over lines 1624 into a tag compare and privilege check circuit 1630. The purpose of the tag compare and privilege check circuit 1630 is to compare the hardware tags (ID) to generated tags to verify that the proper instruction has been delivered. The reference tag is generated through a second tag generation circuit 1632 which is interconnected to the tag compare and privilege check circuit 1630 over a line 1520e. A privilege check is also performed on the delivered instruction to verify that the operation requested by the instruction is permitted given the privilege status of the process (e.g., system program, application program, etc.). This is a conventional check performed by computer processors which support multiple levels of processing states. A hit/miss circuit 1640 determines which RAMs 1610 have delivered the proper instructions to the PIQ bus interface unit 1544 in response to a specific instruction fetch request.

For example, and with reference back to Table 16, if the RAMs 1610 are addressed by circuit 1620 for instruction firing time T16, CACHE0, CACHE2, and CACHE3 would respond with instructions thereby comprising a hit indication on those cache partitions. Cache 1 would not respond and that would constitute a miss indication and this would be determined by circuit 1640 over line 1520g. Thus, each instruction, for instruction firing time T16, is delivered over bus 1632 into the SCSM attacher 1650 wherein dynamic SCSM information, if any, is added to the instruction by an SCSM attacher hardware 1650. For example, hardware 1650 can replace the static SCSM procedural level information (which is a relative value) with the actual procedural level values. The actual values are generataed from a procedural level counter data and the static SCSM information.

When all of the instructions associated with an individual firing time have been read from the RAM 1610, the hit and miss circuit 1640 over lines 1646 informs the instruction cache control unit 1660 of this information. The instruction cache context control unit 1660 contains the next instruction firing time register, a part of the instruction cache control 1518 which increments the instruction firing time to the next value. Hence, in the example, upon the completion of reading all instructions associated with instruction firing time T16, the instruction cache context control unit 1660 increments to the next firing time, T17, and delivers this information over lines 1664 to an access resolution circuit 1670, and over lines 1520f to the tag compare and privilege check circuit 1630. Also note that there may be firing times which have no valid instructions, possibly due to operational dependencies detected by the TOLL software. In this case, no instructions would be fetched from the cache and transmitted to the PIQ interface.

The access resolution circuit 1670 coordinates which circuitry has access to the instruction cache RAMs 1610. Typically, these RAMs can satisfy only a single request at each clock cycle. Since there could be two requests to the RAMs at one time, an arbitration method must be implemented to determine which circuitry obtains access. This is a conventional issue in the design of cache memory, and the access resolution circuit resolves the priority question as is well known in the field.

The present invention can and preferably does support several users simultaneously in both time and space. In previous prior art approaches (CDC, IBM, etc.), multi-user support was accomplished solely by timesharing the processor(s). In other words, the processors were shared in time. In this system, multi-user support is accomplished (in space) by assigning an LRD to each user that is given time on the processor elements. Thus, there is a spatial aspect to the sharing of the processor elements. The operating system of the machine deals with those users assigned to the same LRD in a timeshared manner, thereby adding the temporal dimension to the sharing of the processors.

Multi-user support is accomplished by the multiple LRDs, the use of plural processor elements, and the multiple context files 660 supporting the register files and condition code storage. As several users may be executing in the processor elements at the same time, additional pieces of information must be attached to each instruction prior to its execution to uniquely identify the instruction source and any resources that it may use. For example, a register identifier must contain the absolute value of the subroutine procedural level and the context identifier as well as the actual register number. Memory addresses must also contain the LRD identifier from which the instruction was issued to be properly routed through the LRD-Memory interconnection network to the appropriate data cache.

The additional and required information comprises two components, a static and a dynamic component; and the information is termed "shared context storage mapping" (SCSM). The static information results from the compiler output and the TOLL software gleans the information from the compiler generated instruction stream and attaches the register information to the instruction prior to its being received by an LRD.

The dynamic information is hardware attached to the instruction by the LRD prior to its issuance to the processors. This information is composed of the context/LRD identifier corresponding to the LRD issuing the instruction, the absolute value of the current procedural level of the instruction, the process identifier of the current instruction stream, and preferably the instruction status information that would normally be contained in the processors of a system having processors that are not context free. This later information would be composed of error masks, floating point format modes, rounding modes, and so on.

In the operation of the circuitry in FIG. 16, one or more execution sets are delivered into the instruction cache circuitry. The header information for each set is delivered to one or more successive cache partitions and is routed to the context control unit 1660. The instructions in the execution set are then individually, on a round robin basis, routed to each successive cache partition unit 1522. A hardware identification tag is attached to each instruction and the instruction is then stored in RAM 1610. As previously discussed, each execution set is of sufficient length to minimize instruction cache defaults and the RAM 1610 is of sufficient size to store the execution sets. When the processor elements require the instructions, the number and cache locations of the valid instructions matching the appropriate IFTs are determined. The instructions stored in the RAM's 1610 are read out; the identification tags are verified; and the privilege status checked. The instructions are then delivered to the PIQ bus interface unit 1544. Each instruction that is delivered to the PIQ bus interface unit 1544, as is set forth in Table 17, includes the identification tag (ID) and the hardware added SCSM information.

TABLE 17

| CACHE0: | I4 (T16) (PE2) (ID2) (SCSM0) |
| CACHE1: | I2 (T17) (PE0) (ID3) (SCSM1) |
| CACHE2: | I0 (T16) (PE0) (ID0) (SCSM2) |
|         | I5 (T17) (PE1) (ID4) (SCSM3) |
| CACHE3: | I1 (T16) (PE1) (ID1) (SCSM4) |
|         | I3 (T18) (PE0) (ID5) (SCSM5) |

If an instruction is not stored in RAM 1610, a cache miss occurs and a new execution set containing the instruction is read from main memory over lines 1523.

Figure 17:
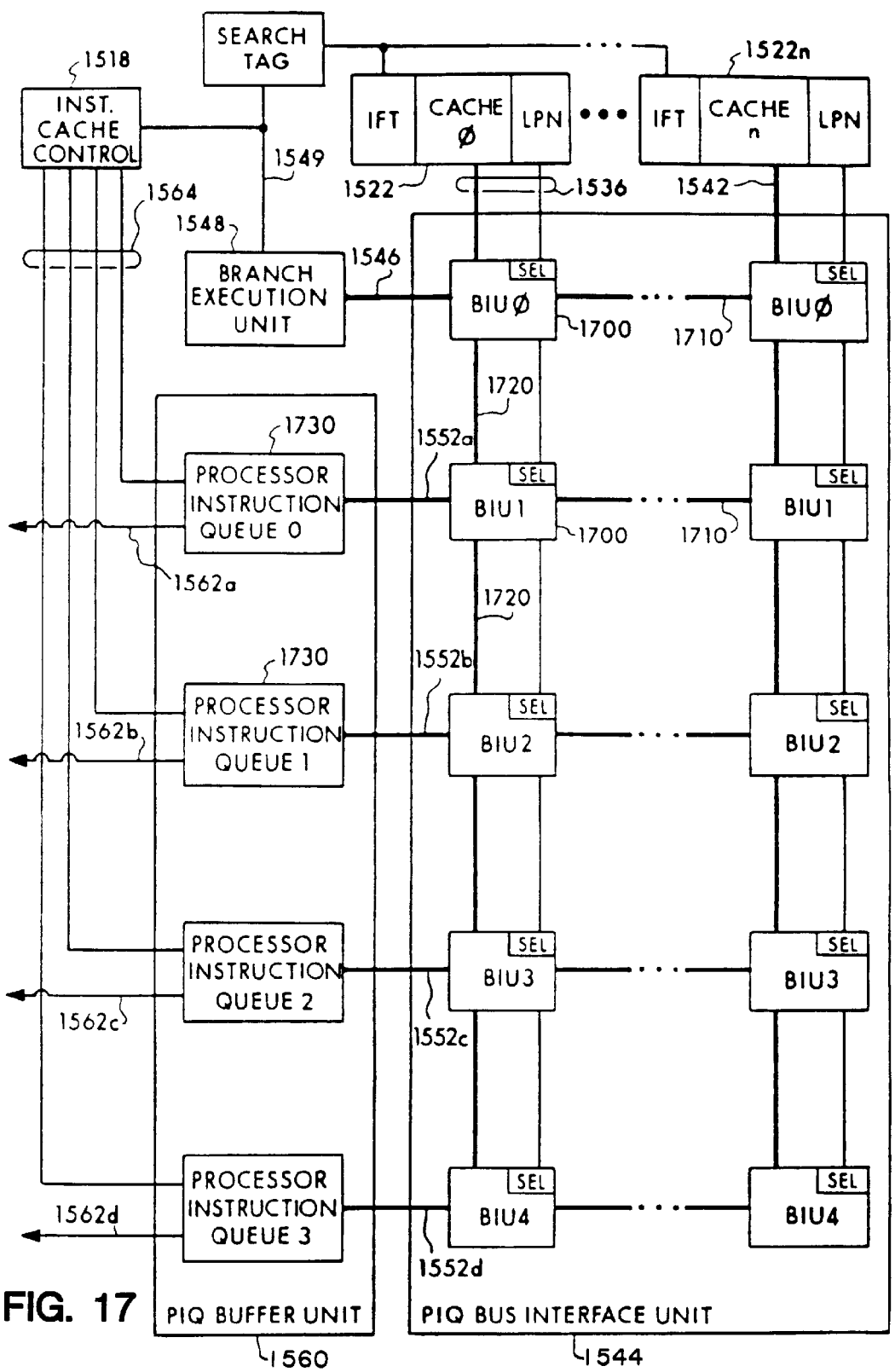
FIG. 17 sets forth the structure of a PIQ buffer unit and a PIQ bus interface unit according to a preferred embodiment of the present invention.

In FIG. 17, the details of the PIQ bus interface unit 1544 and the PIQ buffer unit 1560 are set forth. Referring to FIG. 17, the PIQ bus interface unit 1544 receives instructions as set forth in Table 17, above, over lines 1536. A search tag hardware 1702 has access to the value of the present instruction firing time over lines 1549 and searches the cache memories 1522 to determine the address(es) of those registers containing instructions having the correct firing times. The search tag hardware 1702 then makes available to the instruction cache control circuitry 1518 the addresses of those memory locations for determination by the instruction cache control of which instructions to next select for delivery to the PIQ bus interface 1544.

These instructions access, in parallel, a two-dimensional array of bus interface units (BIU's) 1700. The bus interface units 1700 are interconnected in a full access non-blocking network by means of connections 1710 and 1720, and connect over lines 1552 to the PIQ buffer unit 1560. Each bus interface unit (BIU) 1700 is a conventional address comparison circuit composed of: TI 74L85 4 bit magnitude comparators, Texas Instruments Company, P.O. Box 225012, Dallas, Tex. 75265. In the matrix multiply example, for instruction firing time T16, CACHE0 contains instruction I4 and CACHE3 (corresponding to CACHE n in FIG. 17) contains instruction I1. The logical processor number assigned to instruction I4 is PE2. The logical processor number PE2 activates a select (SEL) signal of the bus interface unit 1700 for processor instruction queue 2 (this is the BIU3 corresponding to the CACHE0 unit containing the instruction). In this example, only that BIU3 is activated and the remaining bus interface units 1700 for that BIU3 row and column are not activated. Likewise, for CACHE3 (CACHE n in FIG. 17), the corresponding BIU2 is activated for processor instruction QUEUE 1.

The PIQ buffer unit 1560 is comprised of a number of processor instruction queues 1730 which store the instructions received from the PIQ bus interface unit 1544 in a first in-first out (FIFO) fashion as shown in Table 18:

TABLE 18

| PIQ0 | PIQ1 | PIQ2 | PIQ3 |
|------|------|------|------|
| I0   | I1   | I4   | —    |
| I2   | —    | —    | —    |
| I3   | —    | —    | —    |

In addition to performing instruction queueing functions, the PIQ's 1730 also keep track of the execution status of each instruction that is issued to the processor elements 640. In an ideal system, instructions could be issued to the processor elements every clock cycle without worrying about whether or not the instructions have finished execution. However, the processor elements 640 in the system may not be able to complete an instruction every clock cycle due to the occurrence of exceptional conditions, such as a data cache miss and so on. As a result, each PIQ 1730 tracks all instructions that it has issued to the processor elements 640 that are still in execution. The primary result of this tracking is that the PIQ's 1730 perform the instruction clocking function for the LRD 620. In other words, the PIQ's 1730 determine when the next firing time register can be updated when executing straightline code. This in turn begins a new instruction fetch cycle.

Instruction clocking is accomplished by having each PIQ 1730 form an instruction done signal that specifies that the instructions issued by a given PIQ either have executed or, in the case of pipelined PE's, have proceeded to the next stage. This is then combined with all other PIQ instruction done signals from this LRD and is used to gate the increment signal that increments the next firing time register. The "done" signals are delivered over lines 1564 to the instruction cache control 1518.

Figure 18:
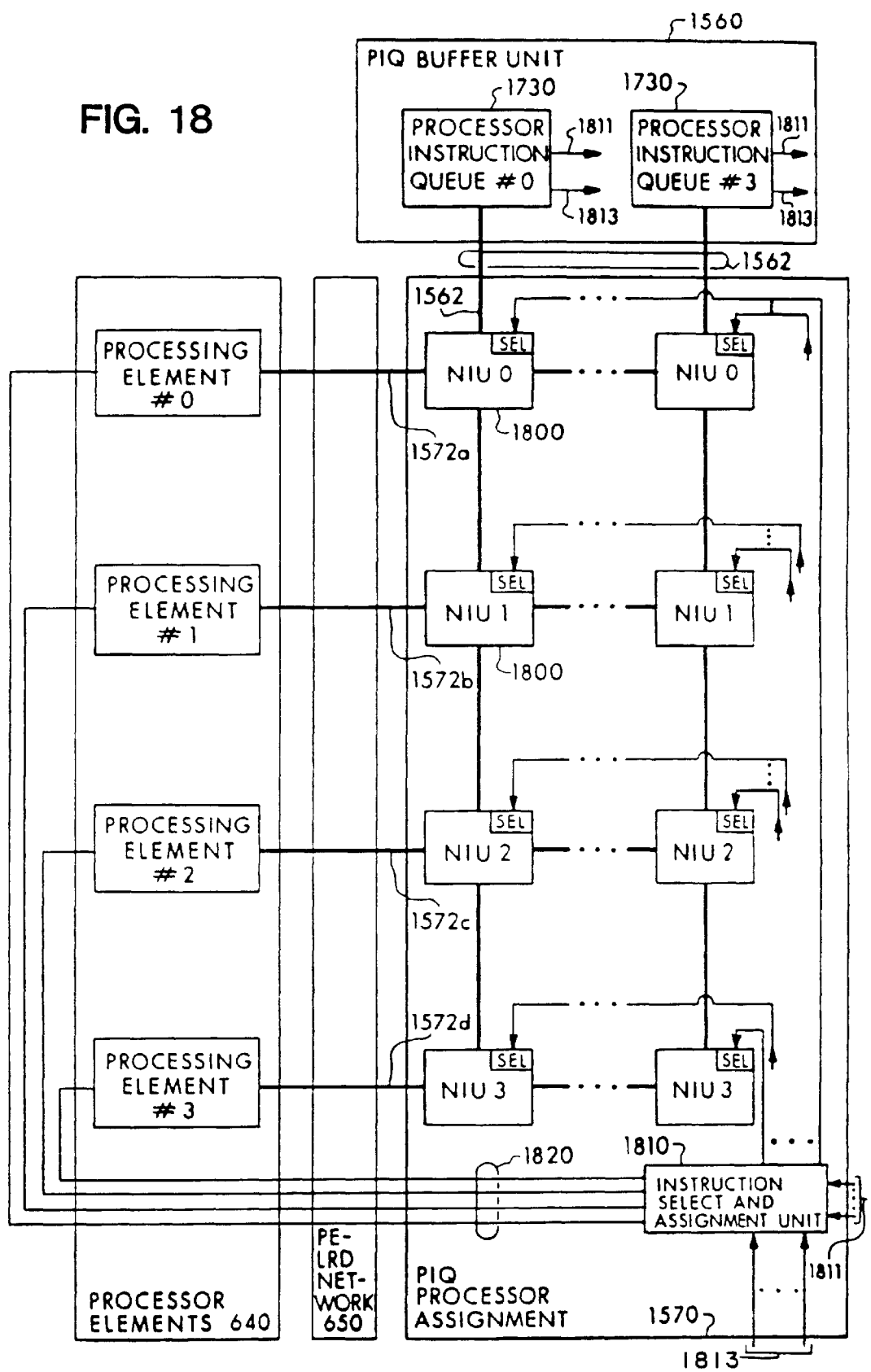
FIG. 18 sets forth interconnection of processor elements through the PE-LRD network to a PIQ processor alignment circuit according to a preferred embodiment of the present invention.

Referring to Figure 18, the PIQ processor assignment circuit 1570 contains a two dimensional array of network interface units (NIU's) 1800 interconnected as a full access switch to the PE-LRD network 650 and then to the various processor elements 640. Each network interface unit (NIU) 1800 is comprised of the same circuitry as the bus interface units (BIU) 1700 of FIG. 17. In normal operation, the processor instruction queue #0 (PIQ0) can directly access processor element 0 by activating the NIU0 associated with the column corresponding to queue #0, the remaining network interface units NIU0, NIU1, NIU2, NIU3 of the PIQ processor alignment circuit for that column and row being deactivated. Likewise, processor instruction queue #3 (PIQ3) normally accesses processor element 3 by activating the NIU3 of the column associated with queue #3, the remaining NIU0, NIU1 NIU2, and NIU3 of that column and row being deactivated. The activation of the network interface units 1800 is under the control of an instruction select and assignment unit 1810.

Unit 1810 receives signals from the PIQ's 1730 within the LRD that the unit 1810 is a member of over lines 1811, from all other units 1810 (of other LRD's) over lines 1813, and from the processor elements 640 through the network 650. Each PIQ 1730 furnishes the unit 1810 with a signal that corresponds to "I have an instruction that is ready to be assigned to a processor." The other PIQ buffer units furnish this unit 1810 and every other unit 1810 with a signal that corresponds to "My PIQ 1730 (#x) has an instruction ready to be assigned to a processor." Finally, the processor elements furnish each unit 1810 in the system with a signal that corresponds to "I can accept a new instruction."

The unit 1810 on an LRD transmits signals to the PIQs 1730 of its LRD over lines 1811, to the network interface units 1800 of its LRD over lines 1860 and to the other units 1810 of the other LRDs in the system over lines 1813. The unit 1810 transmits a signal to each PIQ 1730 that corresponds to "Gate your instruction onto the PE-LRD interface bus (650)." The unit transmits a select signal to the network interface units 1800. Finally, the unit 1810 transmits a signal that corresponds to "I have used processor element #x" to each other unit 1810 in the system for each processor which it is using.

In addition, each unit 1810 in each LRD has associated with it a priority that corresponds to the priority of the LRD. This is used to order the LRDs into an ascending order from zero to the number of LRDs in the system. The method used for assigning the processor elements is as follows. Given that the LRDs are ordered, many allocation schemes are possible (e.g., round robin, first come first served, time slice, etc.). However, these are implementation details and do not impact the functionality of this unit under the teachings of the present invention.

Consider the LRD with the current highest priority. This LRD gets all the processor elements that it requires and assigns the instructions that are ready to be executed to the available processor elements. If the processor elements are context free, the processor elements can be assigned in any manner whatsoever. Typically, however, assuming that all processors are functioning correctly, instructions from PIQ #0 are routed to processor element #0, provided of course, processor element #0 is available.

The unit 1810 in the highest priority LRD then transmits this information to all other units 1810 in the system. Any processors left open are then utilized by the next highest priority LRD with instructions that can be executed. This allocation continues until all processors have been assigned. Hence, processors may be assigned on a priority basis in a daisy chained manner.

If a particular processor element, for example, element 1 has failed, the instruction selective assignment unit 1810 can deactivate that processor element by deactivating all network instruction units NIU1. It can then, through hardware, reorder the processor elements so that, for example, processor element 2 receives all instructions logically assigned to processor element 1, processor element 3 is now assigned to receive all instructions logically assigned to processor 2, etc. Indeed, redundant processor elements and network interface units can be provided to the system to provide for a high degree of fault tolerance.

Clearly, this is but one possible implementation. Other methods are also realizable.

b. Branch Execution Unit (BEU)

Figure 19:
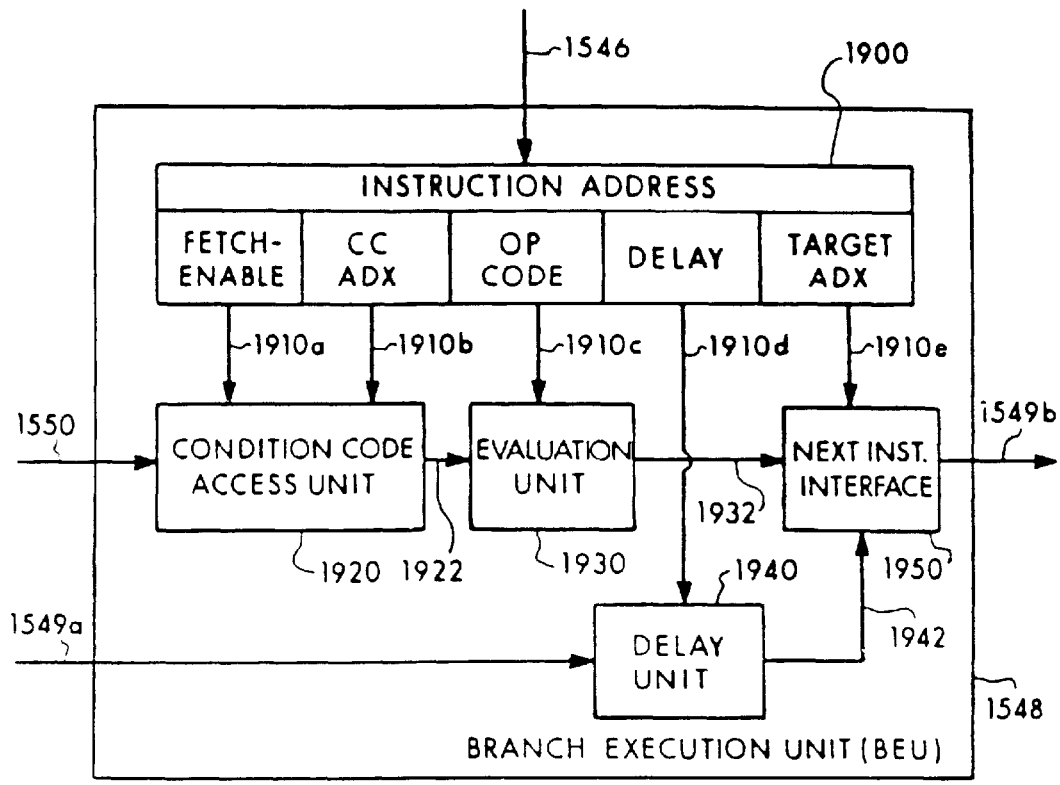
FIG. 19 sets forth the structure of a branch execution unit according to a preferred embodiment of the present invention.

Referring to FIG. 19, the Branch Execution Unit (BEU) 1548 is the unit in the present invention responsible for the execution of all branch instructions which occur at the end of each basic block. There is, in the illustrated embodiment, one BEU 1548 for each supported context and so, with reference to FIG. 6, "n" supported contexts require "n" BEU's. The illustrated embodiment uses one BEU for each supported context because each BEU 1548 is of simple design and, therefore, the cost of sharing a BEU between plural contexts would be more expensive than allowing each context to have its own BEU.

The BEU 1548 executes branches in a conventional manner with the exception that the branch instructions are executed outside the PE's 640. The BEU 1548 evaluates the branch condition and, when the target address is selected, generates and places this address directly into the next instruction fetch register. The target address generation is conventional for unconditional and conditional branches that are not procedure calls or returns. The target address can be (a) taken directly from the instruction, (b) an offset from the current contents of the next instruction fetch register, or (c) an offset of a general purpose register of the context register file.

A return branch from a subroutine is handled in a slightly different fashion. To understand the subroutine return branch, discussion of the subroutine call branch is required. When the branch is executed, a return address is created and stored. The return address is normally the address of the instruction following the subroutine call. The return address can be stored in a stack in memory or in other storage local to the branch execution unit. In addition, the execution of the subroutine call increments the procedural level counter.

The return from a subroutine branch is also an unconditional branch. However, rather than containing the target address within the instruction, this type of branch reads the previously stored return address from storage, decrements the procedural level counter, and loads the next instruction fetch register with the return address. The remainder of the disclosure discusses the evaluation and execution of conditional branches. It should be noted the that techniques described also apply to unconditional branches, since these are, in effect, conditional branches in which the condition is always satisfied. Further, these same techniques also apply to the subroutine call and return branches, which perform the additional functions described above.

To speed up conditional branches, the determination of whether a conditional branch is taken or not, depends solely on the analysis of the appropriate set of condition codes. Under the teachings of the present invention, no evaluation of data is performed other than to manipulate the condition codes appropriately. In addition, an instruction, which generates a condition code that a branch will use, can transmit the code to BEU 1548 as well as to the condition code storage. This eliminates the conventional extra waiting time required for the code to become valid in the condition code storage prior to a BEU being able to fetch it.

The present invention also makes extensive use of delayed branching to guarantee program correctness. When a branch has executed and its effects are being propagated in the system, all instructions that are within the procedural domain of the branch must either have been executed or be in the process of being executed, as discussed in connection with the example of Table 6. In other words, changing the next-instruction pointer (in response to the branch) takes place after the current firing time has been updated to point to the firing time that follows the last (temporally executed) instruction of the branch. Hence, in the example of Table 6, instruction I5 at firing time T17 is delayed until the completion of T18 which is the last firing time for this basic block. The instruction time for the next basic block is then T19.

The functionality of the BEU 1548 can be described as a four-state state machine:

Stage 1: Instruction decode
    Operation decode
    Delay field decode
    Condition code access decode
Stage 2: Condition code fetch/receive
Stage 3: Branch operation evaluation
Stage 4: Next instruction fetch location and firing time update Along with determining the operation to be performed, the first stage also determines how long fetching can continue to take place after receipt of the branch by the BEU, and how the BEU is to access the condition codes for a conditional branch, that is, are they received or fetched.

Referring to FIG. 19, the branch instruction is delivered over bus 1546 from the PIQ bus interface unit 1544 into the instruction register 1900 of the BEU 1548. The fields of the instruction register 1900 are designated as: FETCH/ENABLE, CONDITION CODE ADDRESS, OP CODE, DELAY FIELD, and TARGET ADDRESS. The instruction register 1900 is connected over lines 1910a and 1910b to a condition code access unit 1920, over lines 1910c to an evaluation unit 1930, over lines 1910d to a delay unit 1940, and over lines 1910e to a next instruction interface 1950.

Once an instruction has been issued to BEU 1548 from the PIQ bus interface 1544, instruction fetching must be held up until the value in the delay field has been determined. This value is measured relative to the receipt of the branch by the BEU, that is stage 1. If there are no instructions that may be overlapped with this branch, this field value is zero. In this case, instruction fetching is held up until the outcome of the branch has been determined. If this field is non-zero, instruction fetching may continue for a number of firing times given by the value in this field.

The condition code access unit 1920 is connected to the register file—PE network 670 over lines 1550 and to the evaluation unit 1930 over lines 1922. During stage 2 operation, the condition code access decode unit 1920 determines whether or not the condition codes must be fetched by the instruction, or whether the instruction that determines the branch condition delivers them. As there is only one instruction per basic block that will determine the conditional branch, there will never be more than one condition code received by the BEU for a basic block. As a result, the actual timing of when the condition code is received is not important. If it comes earlier than the branch, no other codes will be received prior to the execution of the branch. If it comes later, the branch will be waiting and the codes received will always be the right ones. Note that the condition code for the basic block can include plural codes received at the same or different times by the BEU.

The evaluation unit 1930 is connected to the next instruction interface 1950 over lines 1932. The next instruction interface 1950 is connected to the instruction cache control circuit 1518 over lines 1549 and to the delay unit 1940 over lines 1942; and the delay unit 1940 is also connected to the instruction cache control unit 1518 over lines 1549.

During the evaluation stage of operation, the condition codes are combined according to a Boolean function that represents the condition being tested. In the final stage of operation, either fetching of the sequential instruction stream continues, if a conditional branch is not taken, or the next instruction pointer is loaded, if the branch is taken.

The impact of a branch in the instruction stream can be described as follows. Instructions, as discussed, are sent to their respective PIQ's 1730 by analysis of the resident logical processor number (LPN). Instruction fetching can be continued until a branch is encountered, that is, until an instruction is delivered to the instruction register 1900 of the BEU 1548. At this point, in a conventional system without delayed branching, fetching would be stopped until the resolution of the branch instruction is complete. See, for example, "Branch Prediction Strategies and Branch Target Buffer Design", J. F. K. Lee & A. J. Smith, IEEE Computer Magazine, January, 1984.

In the present system, which includes delayed branching, instructions must continue to be fetched until the next instruction fetched is the last instruction of the basic block to be executed. The time that the branch is executed is then the last time that fetching of an instruction can take place without a possibility of modifying the next instruction address. Thus, the difference between when the branch is fetched and when the effects of the branch are actually felt corresponds to the number of additional firing time cycles during which fetching can be continued.

The impact of this delay is that the BEU 1548 must have access to the next instruction firing time register of the cache controller 1518. Further, the BEU 1548 can control the initiation or disabling of the instruction fetch process performed by the instruction cache control unit 1518. These tasks are accomplished by signals over bus 1549.

In operation the branch execution unit (BEU) 1548 functions as follows. The branch instruction, such as instruction I5 in the example above, is loaded into the instruction register 1900 from the PIQ bus interface unit 1544. The contents of the instruction register then control the further operation of BEU 1548. The FETCH-ENABLE field indicates whether or not the condition code access unit 1920 should retrieve the condition code located at the address stored in the CC-ADX field (called FETCH) or whether the condition code will be delivered by the generating instruction.

Figure 20:
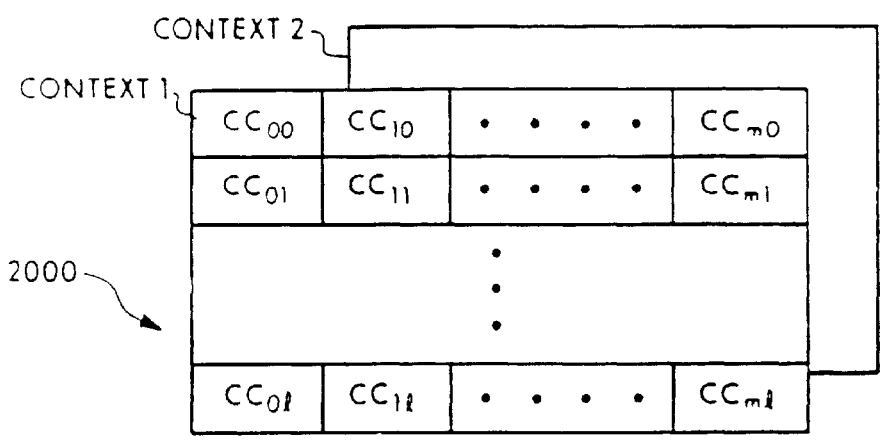
FIG. 20 illustrates the organization of the condition code storage of a context file according to a preferred embodiment of the present invention.

If a FETCH is requested, the unit 1920 accesses the register file-PE network 670 (see FIG. 6) to access the condition code storage 2000 which is shown in FIG. 20. Referring to FIG. 20, the condition code storage 2000, for each context file, is shown in the generalized case. A set of registers $CC_{xy}$ are provided for storing condition codes for procedural level y. Hence, the condition code storage 2000 is accessed and addressed by the unit 1920 to retrieve, pursuant to a FETCH request, the necessary condition code. The actual condition code and an indication that the condition code is received by the unit 1920 is delivered over lines 1922 to the evaluation unit 1930. The OPCODE field, delivered to the evaluation unit 1930, in conjunction with the received condition code, functions to deliver a branch taken signal over line 1932 to the next instruction interface 1950. The evaluation unit 1930 is comprised of standard gate arrays such as those from LSI Logic Corporation, 1551 McCarthy Blvd., Milpitas, Calif. 95035.

The evaluation unit 1930 accepts the condition code set that determines whether or not the conditional branch is taken, and under control of the OPCODE field, combines the set in a Boolean function to generate the conditional branch taken signal.

The next instruction interface 1950 receives the branch target address from the TARGET-ADX field of the instruction register 1900 and the branch taken signal over line 1932. However, the interface 1950 cannot operate until an enable signal is received from the delay unit 1940 over lines 1942.

The delay unit 1940 determines the amount of time that instruction fetching can be continued after the receipt of a branch instruction by the BEU. Previously, it has been described that when a branch instruction is received by the BEU, instruction fetching continues for one more cycle and then stops. The instruction fetched during this cycle is held up from passing through PIQ bus interface unit 1544 until the length of the delay field has been determined. For example, if the delay field is zero (implying that the branch is to be executed immediately), these instructions must still be withheld from the PIQ buffer unit until it is determined whether or not these are the right instructions to be fetched. If the delay field is non-zero, the instructions would be gated into the PIQ buffer unit as soon as the delay value was determined to be non-zero. The length of the delay is obtained from DELAY field of the instruction register 1900. The delay unit receives the delay length from register 1900 and clock impulses from the context control 1518 over lines 1549. The delay unit 1940 decrements the value of the delay at each clock pulse; and when fully decremented, the interface unit 1950 becomes enabled.

Hence, in the discussion of Table 6, instruction is assigned a firing time T17 but is delayed until firing time T18. During the delay time, the interface 1950 signals the instruction cache control 1518 over line 1549 to continue to fetch instructions to finish the current basic block. When enabled, the interface unit 1950 delivers the next address (that is, the branch execution address) for the next basic block into the instruction cache control 1518 over lines 1549.

In summary and for the example on Table 6, the branch instruction I5 is loaded into the instruction register 1900 during time T17. However, a delay of one firing time (DELAY) is also loaded into the instruction register 1900 as the branch instruction cannot be executed until the last instruction I3 is processed during time T18. Hence, even though the instruction I5 is loaded in register 1900, the branch address for the next basic block, which is contained in the TARGET ADDRESS, does not become effective until the completion of time T18. In the meantime, the next instruction interface 1950 issues instructions to the cache control 1518 to continue processing the stream of instructions in the basic block. Upon the expiration of the delay, the interface 1950 is enabled, and the branch is executed by delivering the address of the next basic block to the instruction cache control 1518.

Note that the delay field is used to guarantee the execution of all instructions in the basic block governed by this branch in single cycle context free PE's. A small complexity is encountered when the PE's are pipelined. In this case, there exist data dependencies between the instructions from the basic block just executed, and the instructions from the basic block to be executed. The TOLL software can analyze these dependencies when the next basic block is only targeted by the branch from this basic block. If the next basic block is targeted by more than one branch, the TOLL software cannot resolve the various branch possibilities and lets the pipelines drain, so that no data dependencies are violated. One mechanism for allowing the pipelines to drain is to insert NO-OP (no operation) instructions into the instruction stream. An alternate method provides an extra field in the branch instruction which inhibits the delivery of new instructions to the processor elements for a time determined by the data in the extra field.

c. Processor Elements (PE)

So far in the discussions pertaining to the matrix multiply example, a single cycle processor element has been assumed. In other words, an instruction is issued to the processor element and the processor element completely executes the instruction before proceeding to the next instruction. However, greater performance can be obtained by employing pipelined processor elements. Accordingly, the tasks performed by the TOLL software change slightly. In particular, the assignment of the processor elements is more complex than is shown in the previous example; and the hazards that characterize a pipeline processor must be handled by the TOLL software. The hazards that are present in any pipelined processor manifest themselves as a more sophisticated set of data dependencies. This can be encoded into the TOLL software by one practiced in the art. See for example, T. K. R. Gross, Stanford University, 1983, "Code Optimization of Pipeline Constraints", Doctorate Dissertation Thesis.

The assignment of the processors is dependent on the implementation of the pipelines and again, can be performed by one practiced in the art. A key parameter is determining how data is exchanged between the pipelines. For example, assume that each pipeline contains feedback paths between its stages. In addition, assume that the pipelines can exchange results only through the register sets 660. Instructions would be assigned to the pipelines by determining sets of dependent instructions that are contained in the instruction stream and then assigning each specific set to a specific pipeline. This minimizes the amount of communication that must take place between the pipelines (via the register set), and hence speeds up the execution time of the program. The use of the logical processor number guarantees that the instructions will execute on the same pipeline.

Alternatively, if there are paths available to exchange data between the pipelines, dependent instructions may be distributed across several pipeline processors instead of being assigned to a single pipeline. Again, the use of multiple pipelines and the interconnection network between them that allows the sharing of intermediate results manifests itself as a more sophisticated set of data dependencies imposed on the instruction stream. Clearly, the extension of the teachings of this invention to a pipelined system is within the skill of one practiced in the art.

Importantly, the additional data (chaining) paths do not change the fundamental context free nature of the processor elements of the present invention. That is, at any given time (for example, the completion of any given instruction cycle), the entire process state associated with a given program (that is, context) is captured completely external to the processor elements. Data chaining results merely in a transitory replication of some of the data generated within the processor elements during a specific instruction clock cycle.

Figure 21:
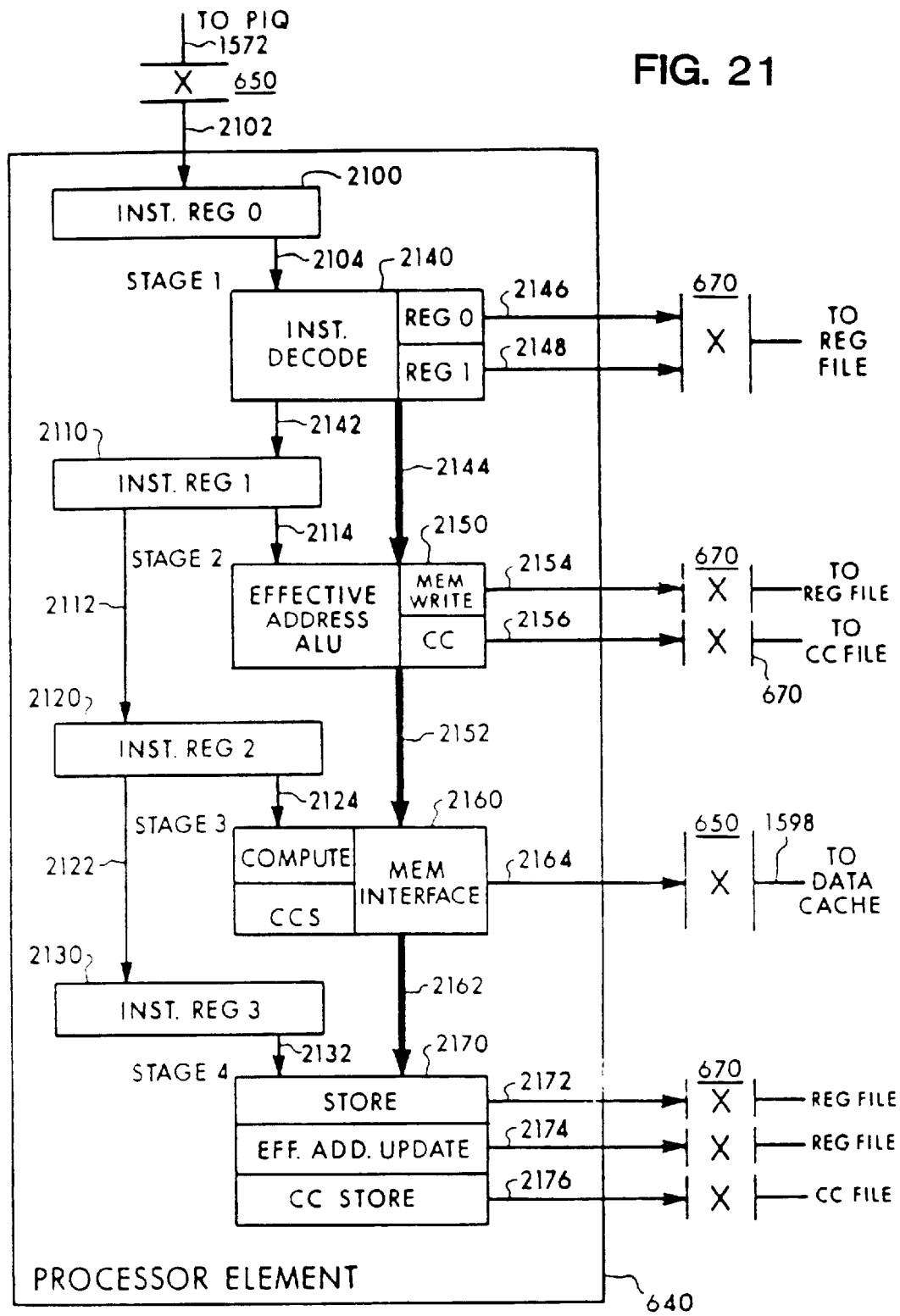
FIG. 21 sets forth the structure of one embodiment of a pipelined processor element according to the present invention.

Referring to FIG. 21, a particular processor element 640 has a four-stage pipeline processor element. All processor elements 640 according to the illustrated embodiment are identical. It is to be expressly understood, that any prior art type of processor element such as a micro-processor or other pipeline architecture could not be used under the teachings of the present invention, because such processors retain substantial state information of the program they are processing. However, such a processor could be programmed with software to emulate or simulate the type of processor necessary for the present invention.

The design of the processor element is determined by the instruction set architecture generated by the TOLL software and, therefore, from a conceptual viewpoint, is the most implementation dependent portion of this invention. In the illustrated embodiment shown in FIG. 21, each processor element pipeline operates autonomously of the other processor elements in the system. Each processor element is homogeneous and is capable, by itself, of executing all computational and data memory accessing instructions. In making computational executions, transfers are from register to register and for memory interface instructions, the transfers are from memory to registers or from registers to memory.

Referring to FIG. 21, the four-stage pipeline for the processor element 640 of the illustrated embodiment includes four discrete instruction registers 2100, 2110, 2120, and 2130. Each processor element also includes four stages: stage 1, 2140; stage 2, 2150; stage 3, 2160, and stage 4, 2170. The first instruction register 2100 is connected through the network 650 to the PIQ processor assignment circuit 1570 and receives that information over bus 2102. The instruction register 2100 then controls the operation of stage 1 which includes the hardware functions of instruction decode and register 0 fetch and register 1 fetch. The first stage 2140 is interconnected to the instruction register over lines 2104 and to the second instruction register 2110 over lines 2142. The first stage 2140 is also connected over a bus 2144 to the second stage 2150. Register 0 fetch and register 1 fetch of stage 1 are connected over lines 2146 and 2148, respectively, to network 670 for access to the register file 660.

The second instruction register 2110 is further interconnected to the third instruction register 2120 over lines 2112 and to the second stage 2150 over lines 2114. The second stage 2150 is also connected over a bus 2152 to the third stage 2160 and further has the memory write (MEM WRITE) register fetch hardware interconnected over lines 2154 to network 670 for access to the register file 660 and its condition code (CC) hardware connected over lines 2156 through network 670 to the condition code storage of context file 660.

The third instruction register 2120 is interconnected over lines 2122 to the fourth instruction register 2130 and is also connected over lines 2124 to the third stage 2160. The third stage 2160 is connected over a bus 2162 to the fourth stage 2170 and is further interconnected over lines 2164 through network 650 to the data cache interconnection network 1590.

Finally, the fourth instruction register 2130 is interconnected over lines 2132 to the fourth stage, and the fourth stage has its store hardware (STORE) output connected over lines 2172 and its effective address update (EFF. ADD.) hardware circuit connected over lines 2174 to network 670 for access to the register file 660. In addition, the fourth stage has its condition code store (CC STORE) hardware connected over lines 2176 through network 670 to the condition code storage of context file 660.

The operation of the four-stage pipeline shown in FIG. 21 will now be discussed with respect to the example of Table 1 and the information contained in Table 19 which describes the operation of the processor element for each instruction.

TABLE 19

Instruction I0, (I1):

Stage 1 - Fetch Reg to form Mem-adx
    Stage 2 - Form Mem-adx
    Stage 3 - Perform Memory Read
    Stage 4 - Store R0, (R1)

Instruction I2:

Stage 1 - Fetch Reg R0 and R1
    Stage 2 - No-Op
    Stage 3 - Perform multiply
    Stage 4 - Store R2 and CC Instruction I3:

Stage 1 - Fetch Reg R2 and R3
    Stage 2 - No-Op
    Stage 3 - Perform addition
    Stage 4 - Store R3 and CC Instruction I4:

Stage 1 - Fetch Reg R4
    Stage 2 - No-Op
    Stage 3 - Perform decrement
    Stage 4 - Store R4 and CC For instructions I0 and I1, the performance by the processor element 640 in FIG. 21 is the same except in stage 4. The first stage is to fetch the memory address from the register which contains the address in the register file. Hence, stage 1 interconnects circuitry 2140 over lines 2146 through network 670 to that register and downloads it into register 0 from the interface of stage 1. Next, the address is delivered over bus 2144 to stage 2, and the memory write hardware forms the memory address. The memory address is then delivered over bus 2152 to the third stage which reads memory over 2164 through network 650 to the data cache interconnection network 1590. The results of the read operation are then stored and delivered to stage 4 for storage in register R0. Stage 4 delivers the data over lines 2172 through network 670 to register R0 in the register file. The same operation takes place for instruction I1 except that the results are stored in register 1. Hence, the four stages of the pipeline (Fetch, Form Memory Address, Perform Memory Read, and Store The Results) flow data through the pipe in the manner discussed, and when instruction I0 has passed through stage 1, the first stage of instruction I1 commences. This overlapping or pipelining is conventional in the art.

Instruction I2 fetches the information stored in registers R0 and R1 in the register file 660 and delivers them into registers REG0 and REG1 of stage 1. The contents are delivered over bus 2144 through stage 2 as a no operation and then over bus 2152 into stage 3. A multiply occurs with the contents of the two registers, the results are delivered over bus 2162 into stage 4 which then stores the results over lines 2172 through network 670 into register R2 of the register file 660. In addition, the condition code data is stored over lines 2176 in the condition code storage of context files 660.

Instruction I3 performs the addition of the data in registers R2 and R3 in the same fashion, to store the results, at stage 4, in register R3 and to update the condition code data for that instruction. Finally, instruction I4 operates in the same fashion except that stage 3 performs a decrement of the contents of register R4.

Hence, according to the example of Table I, the instructions for PE0, would be delivered from the PIQ0 in the following order: I0, I2, and I3. These instructions would be sent through the PE0 pipeline stages (S1, S2, S3, and S4), based the upon the instruction firing times (T16, T17, and T18), as follows:

TABLE 20

| PE   | Inst | T16 | T17 | T18 | T19 | T20 | T21 |
|------|------|-----|-----|-----|-----|-----|-----|
| PE0: | I0   | S1  | S2  | S3  | S4  |     |     |
|      | I2   |     | S1  | S2  | S3  | S4  |     |
|      | I3   |     |     | S1  | S2  | S3  | S4  |
| PE1: | I1   | S1  | S2  | S3  | S4  |     |     |
| PE2: | I4   | S1  | S2  | S3  | S4  |     |     |

The schedule illustrated in Table 20 is not however possible unless data chaining is introduced within the pipeline processor (intraprocessor data chaining) as well as between pipeline processors (interprocessor data chaining). The requirement for data chaining occurs because an instruction no longer completely executes within a single time cycle illustrated by, for example, instruction firing time T16. Thus, for a pipeline processor, the TOLL software must recognize that the results of the store which occurs at stage 4 (T19) of instructions I0 and I1 are needed to perform the multiply at stage 3 (T19) of instruction I2, and that fetching of those operands normally takes place at stage 1 (T17) of instruction I2. Accordingly, in the normal operation of the pipeline, for processors PE0 and PE1, the operand data from registers R0 and R1 is not available until the end of firing time T18 while it is needed by stage 1 of instruction I2 at time T17.

To operate according to the schedule illustrated in Table 20, additional data (chaining) paths must be made available to the processors, paths which exist both internal to the processors and between processors. These paths, well known to those practiced in the art, are the data chaining paths. They are represented, in FIG. 21, as dashed lines 2180 and 2182. Accordingly, therefore, the resolution of data dependencies between instructions and all scheduling of processor resources which are performed by the TOLL software prior to program execution, take into account the availability of data chaining when needed to make available data directly from the output, for example, of one stage of the same processor or a stage of a different processor. This data chaining capability is well known to those practiced in the art and can be implemented easily in the TOLL software analysis by recognizing each stage of the pipeline processor as being, in effect, a separate processor having resource requirements and certain dependencies, that is, that an instruction when started through a pipeline will preferably continue in that same pipeline through all of its processing stages. With this in mind, the speed up in processing can be observed in Table 20 where the three machine cycle times for the basic block are completed in a time of only six pipeline cycles. It should be borne in mind that the cycle time for a pipeline is approximately one-fourth the cycle time for the non-pipeline processor in the illustrated embodiment of the invention.

The pipeline of FIG. 21 is composed of four equal (temporal) length stages. The first stage 2140 performs the instruction decode, determines what registers to fetch and store, and performs up to two source register fetches which can be required for the execution of the instruction.

The second stage 2150 is used by the computational instructions for the condition code fetch if required. It is also the effective address generation stage for the memory interface instructions.

The effective address operations that are supported in the preferred embodiment of the invention are:
1. Absolute address
   The full memory address is contained in the instruction.
2. Register indirect
   The full memory address is contained in a register.
3. Register indexed/based
   The full memory address is formed by combining the designated registers and immediate data.
   a. Rn op K
   b. Rn op Rm
   c. Rn op K op Rm
   d. Rn op Rm op K where "op" can be addition (+), subtraction (−), or multiplication (*) and "K" is a constant.

As an example, the addressing constructs presented in the matrix multiply inner loop example are formed from case 3-a where the constant "K" is the length of a data element within the array and the operation is addition (+).

At a conceptual level, the effective addressing portion of a memory access instruction is composed of three basic functions; the designation and procurement of the registers and immediate data needed for the calculation, the combination of these operands in order to form the desired address, and if necessary, updating of any one of the registers involved. This functionality is common in the prior art and is illustrated by the autoincrement and autodecrement modes of addressing available in the DEC processor architecture. See, for example, DEC VAX Architecture Handbook.

Aside from the obvious hardware support required, the effective addressing is supported by the TOLL software, and impacts the TOLL software by adding functionality to the memory accessing instructions. In other words, an effective address memory access can be interpreted as a concatenation of two operations, the first being the effective address calculation and the second being the actual memory access. This functionality can be easily encoded into the TOLL software by one skilled in the art in much the same manner as an add, subtract or multiply instruction would be.

The described effective addressing constructs are to be interpreted as but one possible embodiment of a memory accessing system. There are a plethora of other methods and modes for generating a memory address that are known to those skilled in the art. In other words, the effective addressing constructs described above are for design completeness only, and are not to be construed as a key element in the design of the system.

Referring to FIG. 22, various structures of data or data fields within the pipeline processor element of FIG. 21 are illustrated for a system which is a multi-user system in both time and space. As a result, across the multiple pipelines, instructions from different users may be executing, each with its own processor state. As the processor state is not typically associated with the processor element, the instruction must carry along the identifiers that specify this state. This processor state is supported by the LRD, register file and condition code file assigned to the user.

Figure 22A:
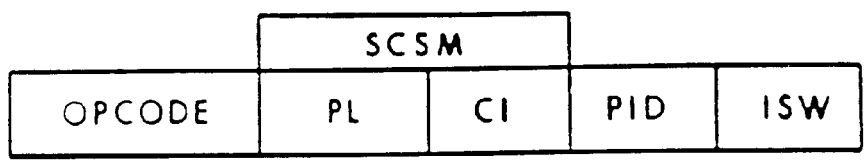
FIGS. 22(*a*) through 22(*d*) set forth the data structures used in connection with the processor element of FIG. 21.
Figure 22B:
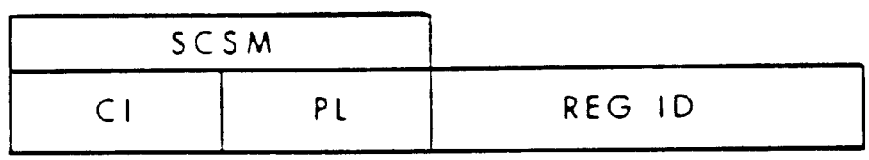
Figure 22C:
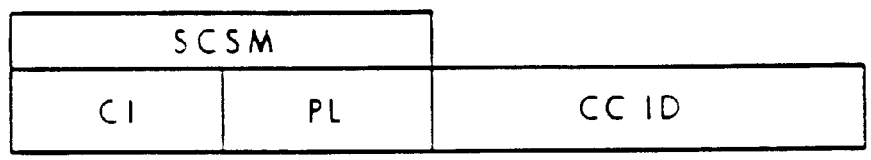
Figure 22D:

A sufficient amount of information must be associated with each instruction so that each memory access, condition code access or register access can uniquely identify the target of the access. In the case of the registers and condition codes, this additional information constitutes the absolute value of the procedural level (PL) and context identifiers (CI) and is attached to the instruction by the SCSM attachment unit 1650. This is illustrated in FIGS. 22a, 22b and 22c respectively. The context identifier portion is used to determine which register or condition code plane (FIG. 6) is being accessed. The procedural level is used to determine which procedural level of registers (FIG. 13) is to be accessed.

Memory accesses also require that the LRD that supports the current user be identified so that the appropriate data cache can be accessed. This is accomplished through the context identifier. The data cache access further requires that a process identifier (PID) for the current user be available to verify that the data present in the cache is indeed the data desired. Thus, an address issued to the data cache takes the form of FIG. 22d. The miscellaneous field is composed of additional information describing the access, for example, read or write, user or system, etc.

Finally, due to the fact that there can be several users executing across the pipelines during a single time interval, information that controls the execution of the instructions, and which would normally be stored within the pipeline, must be associated with each instruction instead. This information is reflected in the ISW field of an instruction word as illustrated in FIG. 22a. The information in this field is composed of control fields like error masks, floating point format descriptors, rounding mode descriptors, etc. Each instruction would have this field attached, but, obviously, may not require all the information. This information is used by the ALU stage 2160 of the processor element.

This instruction information relating to the ISW field, as well as the procedural level, context identification and process identifier, are attached dynamically by the SCSM attacher (1650) as the instruction is issued from the instruction cache.

Although the system of the present invention has been specifically set forth in the above disclosure, it is to be understood that modifications and variations can be made thereto which would still fall within the scope and coverage of the following claims.

We claim:

1. A parallel processor system for processing natural concurriencies in streams of low level instructions contained in a plurality of programs in said system, each of said streams having a plurality of single entry-single exit (SESE) basic blocks (BBs), said system comprising:

means (160) for statically adding intelligence to each instruction in each of said plurality of basic blocks for each said program, said added intelligence at least having a logical processor number (LPN) and an instruction firing time (IFT)

a plurality of contexts (660), each of said contexts being assigned to one of said plurality of programs for processing one of said programs, each of said contexts having at least a plurality of registers and a plurality of condition code storages for containing processing status information, a plurality of logical resource drivers (LRDs) with each logical resource driver being assigned to on eof said plurality of contexts, each of said logical resource drivers being receptive of said basic blocks corresponding to the program instruction stream of said assigned program from said adding means, each of said logical resource drivers comprising:

(a) a plurality of queues (1560), and (b) means (630, 6200 operative on said plurality of said basic blocks containing said intelligence from said adding means for delivering said instruction sin each said basic block into said plurality of queues based on said logical processor number, said instruction sin each said queue being entered according to said instruction firing time wherein the earliest instruction firing time is entered first, a plurality of individual processor elements (PEs), each of said processor elements being free of any context information, means (650) connecting said plurality of processor elements to said plurality of logical resource drivers for transferring said instructions with the earliest instruction firing time first in said queues from each of said logical resource drivers, in a predetermined order, to individually assigned processor elements, each said processor element being capable of processing said transferred instruction, first means (670) for connecting each of said processor elements with any one of said plurality of contexts, each of said processor elements being capable of accessing said plurality of registers and condition code storages in a program's context during the processing of the program's instruction, a plurality of memory locations (610), and second means (620, 630) for connecting each of said processor elements with any one of said plurality of memory locations, each said processor element being capable of accessing said memory locations during said processing of each said instruction.

2. The processor system of claim 1 further comprising, a system for using multiple sets of condition values, the processor system comprising:

an opcode storage configured to buffer a plurality of opcodes corresponding to at least some of said low level instructions to be processed;

a first circuit coupled to said opcode storage, said first circuit configured to receive an opcode of a first type of instruction and to generate a set of at least one condition value;

a condition storage coupled to said first circuit, said condition storage configured to store a plurality of said sets of condition values;

a second circuit coupled to said opcode storage, said second circuit configured to receive an opcode of a second type of instruction and to generate a set of at least one output value, said output value for each second said type of instruction depending on a particular one of said stored sets of condition values; and an access circuit coupled between said condition storage, and said second circuit, said access circuit configured to access said particular stored set of condition values for each said opcode of second type.

3. In an instruction processing apparatus, a system for using multiple sets of condition values within a single context, the system comprising:

an opcode storage configured to buffer a plurality of opcodes corresponding to at least some of said instructions to be processed from said context;

a first circuit coupled to said opcode storage, said first circuit configured to receive opcodes of a first type of instruction and addresses for storing sets of at least one condition value, and to generate for each said opcode of said first type a set of at least one condition value associated with one of the addresses;

a condition storage coupled to said first circuit, said condition storage configured to store a plurality of said sets of condition values at storage locations based upon addresses received from the first circuit;

a second circuit coupled to said opcode storage, said second circuit configured to receive opcodes of a second type of instruction and condition storage addresses, and to generate a set of at least one output value, said output value for each said second type of instruction depending on a particular one of said stored sets of condition values associated with the condition storage address; and an access circuit coupled between said condition storage and said second circuit, said access circuit configured to access by the condition storage address said particular one of said stored sets of condition values for each said opcode of said second type.

4. The system of claim 3 further wherein said first type of instruction consists of arithmetic and logic type instructions.

5. The system of claim 3 further wherein said second type of instruction consists of branch type instructions.

6. The system of claim 3 further wherein said plurality of sets of condition values comprises at least three sets of condition values.

7. The system of claim 6 further wherein there are four sets of condition values.

8. The system of claim 3 further wherein said access circuit comprises an address selection circuit.

9. The system of claim 8 further wherein said address selection circuit receives an address input specified by said second type of instruction.

10. The system of claim 3 further comprising third circuits that receive opcode inputs of said first type of instructions and generate additional sets of condition values.

11. The system of claim 3 further wherein said set of output values comprises a target address of a conditional branch type instruction.

12. The system of claim 3 further comprising a general purpose register file separate from said condition storage.

13. The system of claim 3 further wherein said sets of condition values are stored as condition codes, each said condition code comprising a plurality of flag bits.

14. The system of claim 13 further wherein one of said flag bits represents a zero result of said first type of instruction.

15. The system of claim 14 further wherein said first type of instruction is a decrement instruction.

16. The system of claim 3 further wherein said opcode storage comprises a processor instruction queue, said queue configured to buffer instructions waiting to be executed and to track the execution status of instructions that are issued.

17. The system of claim 3 further comprising an allocate circuit coupled between said first circuit and said condition storage, said allocate circuit configured to assign said set of condition values to a physical location in said condition storage.

18. The system of claim 17 further wherein said physical location is assigned based on an address specified by said first type of instruction.

19. A method of processing a stream of instructions within a single context using multiple sets of at least one condition value, a first type of said instructions each generating a set of at least one condition value and a second type of said instructions each producing a result that depends on one of said generated sets of at least one condition value, the method comprising:

issuing a first instruction of said first type with a first address for storing a first set of at least one condition value;

generating a first set of at least one condition value;

storing said first set of at least one condition value in a storage location having said first address in a condition storage, wherein said condition storage has a plurality of locations, each said location is associated with a different address and is configured to store a plurality of condition values;

no earlier than issuing said first instruction of said first type, issuing a second instruction of said first type with a second address for storing a second set of at least one condition value;

generating a second set of at least one condition value;

storing said second set of at least one condition value in a second storage location having said second address in said condition storage, wherein said first storage location and said second storage location are different storage locations in said condition storage;

no earlier than issuing said second instruction of said first type, issuing an instruction of said second type with said first address that depends on said first set of at least one condition value stored in said first storage location; and accessing said first set of at least one condition value stored in said condition storage having said first address.

20. The method of claim 19 further wherein said processing of said first instruction of said first type comprises the step of decrementing a data value.

21. The method of claim 19 further wherein said processing of said instruction of said second type comprises the step of evaluating whether a branch is taken.

22. The method of claim 19 further wherein said processing step comprises the step of storing at least three sets of condition values.

23. The method of claim 22 further wherein there are four sets of condition values.

24. The method of claim 19 further comprising the step of generating a target address of a branch type instruction.

25. The method of claim 19 further wherein each step of storing sets of condition values comprises the step of storing condition codes, each said condition code having a plurality of flag bits.

* * * * *

(12) EX PARTE REEXAMINATION CERTIFICATE (6517th)
United States Patent
Morrison et al.

(10) Number: US 6,253,313 C1
(45) Certificate Issued: *Nov. 11, 2008

(54) PARALLEL PROCESSOR SYSTEM FOR PROCESSING NATURAL CONCURRENCIES AND METHOD THEREFOR

(75) Inventors: Gordon Edward Morrison, Denver, CO (US); Christopher Bancroft Brooks, Boulder, CO (US); Frederick George Gluck, Boulder, CO (US)

(73) Assignee: Equipment Investment & Management Co., Palm Beach Gardens, FL (US)

Reexamination Request:
No. 90/007,922, Feb. 9, 2006
No. 90/008,156, Oct. 20, 2006

Reexamination Certificate for:
Patent No.: 6,253,313
Issued: Jun. 26, 2001
Appl. No.: 08/480,691
Filed: Jun. 7, 1995

(*) Notice: This patent is subject to a terminal disclaimer.

Related U.S. Application Data

(62) Division of application No. 08/254,687, filed on Jun. 6, 1994, now Pat. No. 5,517,628, which is a division of application No. 08/093,794, filed on Jul. 19, 1993, now abandoned, which is a continuation of application No. 07/913,736, filed on Jul. 14, 1992, now abandoned, which is a continuation of application No. 07/560,093, filed on Jul. 30, 1990, now abandoned, which is a division of application No. 07/372,247, filed on Jun. 26, 1989, now Pat. No. 5,021,945, which is a division of application No. 06/794,221, filed on Oct. 31, 1985, now Pat. No. 4,847,755.

(51) Int. Cl.
*G06F 13/00* (2006.01)
*G06F 9/40* (2006.01)
*G06F 9/42* (2006.01)
*G06F 9/44* (2006.01)
*G06F 9/45* (2006.01)
*G06F 9/38* (2006.01)

(52) U.S. Cl. .................. 712/226; 712/228; 712/233; 712/234; 712/E9.049; 712/E9.056; 712/E9.062; 712/E9.082; 712/E9.083

(58) Field of Classification Search .................. None
See application file for complete search history.

(56) References Cited

U.S. PATENT DOCUMENTS

| 3,343,135 A | 9/1967 | Freiman et al. |
| 3,577,189 A | 5/1971 | Cocke .................. 712/219 |
| 3,577,190 A | 5/1971 | Cocke .................. 712/226 |

(Continued)

FOREIGN PATENT DOCUMENTS

| JP | 60-110043 | 6/1985 |
| JP | 60-144830 | 7/1985 |

OTHER PUBLICATIONS

T.K.M. Agerwala, *New Condition Code and Branch Architecture for High Performance Processors*, IBM Technical Disclosure Bulletin, vol. 25, No. 1, pp. 135–136, Jun. 1982.
*IBM System/370 Model 168 Functional Characteristics*, IBM published manual, Sixth Edition, Jun. 1977.

(Continued)

*Primary Examiner*—Linh My Nguyen

(57) ABSTRACT

A computer processing system containing a plurality of identical processor elements each of which does not retain execution state informaton from prior operations. The plurality of identical processor elements operate on a statically compiled program which, based upon detected natural concurrencies in the basic blocks of the programs, provide logical processor numbers and an instruction firing time to each instruction in each basic block. Each processor element is capable of executing instructions on a per instruction basis such that dependent instructions can execute on the same or different processor elements. A given processor element is capable of executing an instruction from one context followed by an instruction from another context through use of shared storage resources.

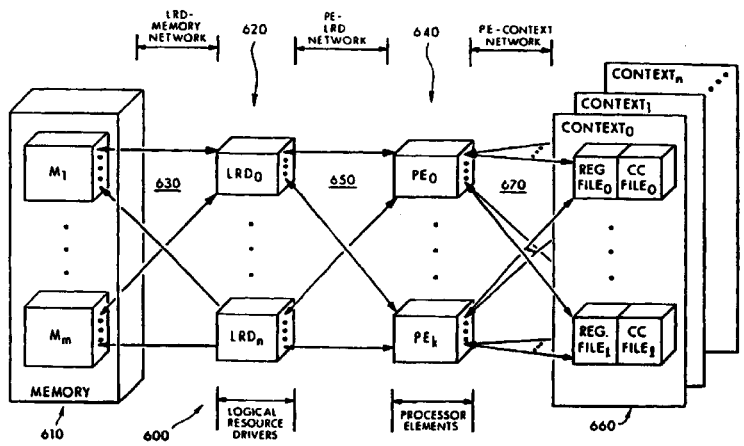

U.S. PATENT DOCUMENTS

| | | | |
|---|---|---|---|
| 3,611,306 | A | 10/1971 | Reigel et al. |
| 3,771,141 | A | 11/1973 | Culler .................... 712/203 |
| 3,833,889 | A | 9/1974 | Cray ...................... 712/220 |
| 4,104,720 | A | 8/1978 | Gruner |
| 4,109,311 | A | 8/1978 | Blum et al. |
| 4,153,932 | A | 5/1979 | Dennis et al. |
| 4,181,936 | A | 1/1980 | Kober |
| 4,228,495 | A | 10/1980 | Bernhard et al. |
| 4,229,790 | A | 10/1980 | Gilliland et al. |
| 4,241,398 | A | 12/1980 | Carll |
| 4,270,167 | A | 5/1981 | Koehler et al. |
| 4,295,193 | A | 10/1981 | Pomerene .............. 712/215 |
| 4,435,758 | A | 3/1984 | Lorie et al. |
| 4,466,061 | A | 8/1984 | Desantis et al. |
| 4,468,736 | A | 8/1984 | Desantis et al. |
| 4,589,087 | A | 5/1986 | Auslander .............. 708/670 |
| 4,742,453 | A | 5/1988 | Shibuya |
| 4,847,755 | A | 7/1989 | Morrison ............... 712/234 |
| 5,021,945 | A | 6/1991 | Morrison ............... 712/234 |
| 5,517,628 | A | 5/1996 | Morrison |
| 6,253,313 | B1 | 6/2001 | Morrison et al. |
| 6,704,859 | B1 | 3/2004 | Jacobs .................... 712/237 |

OTHER PUBLICATIONS

*IBM System/370 RPQ High Accuracy Arithmetic*, IBM Publication No. SA22–7093–0.

File Wrapper to the '313 patent.

File Wrapper to U.S. Appl. No. 08/914,077. (1—Office Action mailed Aug. 4, 1998; 2—Final Office Action mailed May 10, 1999; 3—Complete File Wrapper of U.S. Appl. No. 08/914,077).

BIAX Corporation's Opening Claim Construction Brief filed Feb. 25, 2003 in the litigation *BIAX Corporation v. Apple Computer, Inc., et al.* No. 01–601–KAJ (Del. 2001).

Claim Chart for claims 3–25 of the '313 patent in view of Shibuya, and further view of Agerwala.

Claim Chart for claims 3–25 of the '313 patent in view of Agerwala, and further in view of the IBM System/370 manual.

Walter G. Rosocha, *Adaptive Microprogramming and Processor Modelling*, Technical report CSRG–96. The Computer Systems Research Group, University of Toronto, Aug. 1978.

CDC Control Data 7600 Computer System Preliminary Reference Manual, Publications No. 60258200, 1969.

Cray Computer Systems, Cray–2 Computer System Functional Description, HR–2000, 1985.

Dasgupta, Subrata, *The Organization of Microprogram Stores*, Simon Fraser University, Burnaby, Canada, 1979.

Dasgupta, Subrata, *Some Aspect of High Level Microprogramming*, University of Alberta, 1980.

Digital Equipment Corp., DECsystem–10/DECSYSTEM–20 Processor Reference manual AD–H391A–T1.

Ellis, John R., *Bulldog: A Compiler for VLIW Architectures*, Yale University, 1985.

Fisher, Joseph A. *Very Long Instruction Word Architectures and the ELI–512*, Hewlett–Packard Laboratories, Jun. 1983.

Gross, Thomas Karl Richard, *Code Optimization of Pipeline Constraints*, Stanford University, 1983.

Hennessy, John, *VLSI Processor Architecture*, IEEE Transactions on Computers, Dec. 1984.

Honeywell, Inc., *Honeywell 800 Programmers' Reference Manual*, 1960.

Hoogerbrugge, Jan, *Internals of tmsched v2.0*, Phillips Electronics N.V. 1997.

Kowalik, *Parallel MIMD Computations HEP Supercomputer and Its Applications*, MIT Press, 1985.

Kraley, Michael, Randall Rettberg, Philip Herman, Robert Bressler and Anthony Lake, *Design of a User–Microprogrammable Building Block*, Computer Systems Division.

Landskov, David, Scott Davidson, and Bruce Shriver, *Local Microcode Compaction Techniques*, Computing Surveys, Sep. 1980.

Mahike, Scott, Richard E. Hank, James E. McCormick, David I. August and Wen–mei Hwu, *A Comparison of Full and Partial Predicated Execution Support for ILP Processors*, Center for Reliable and High–Performance Computing, University of Illinois, Jun. 1995.

Marti, Jed B. and Robert R. Kessler, *A Medium Level Compiler Generating Microcode*, University of Utah, 1979.

McDowell, Charles. "A simple architecture for low level parallelism" Proceedings of the 1983 International Conference on Parallel Processing. Aug. 23–26, 1983.

McDowell, Charles, *SIMAC: A Simple Multiple ALU Computer*, University of California San Diego, 1983.

Nicolau, Alexandru, *Parallelism, Memory Anti–Aliasing and Correctness for Trace Scheduling Compliers*, Yale University, 1984.

Pol, E.J.D., P. Struik, F. W. Sijstermans, M.J.A. Tromp, J.W. van de Waerdt and P. van der Wolf, *TriMedia CPU64 Application Development Enviornment*, Philips Research Laboratories, 1999.

Rau, B. Ramakrishna, *Levels of Representation of Programs and the Architecture of Universal Host Machines*, University of Illinois, Irbana, Il. 1978.

Radin, George, *The 801 Minicomputer*, 1982.

Rideout, Douglas J., *Considerations for Local Compaction of Nanocode for the Nanodata QM–1*, University of Alberta.

Rosin, Roberta F., Gideon Frieder and Richard H. Eckhouse Jr., *An Environment for Research in Microprogramming and Emulation*, State University of New York at Buffalo, 1972.

Rosocha, Walter G., *Adaptive Microprogramming and Processor Modelling*, Technical Report CSRG–96, Aug. 1978.

Rosocha, Water, *Performance Enhancement of SISD Processors*, Computer Systems Research Group, 1979.

Schorr, H., *Design Principles for a High–Performance System*, Polytechnic Institute of Brooklyn, 1971.

Stone, Harold S. *Introduction to Computer Organization and Data Structures*, Stanford University, 1972.

Thornton, James E., Design of a Computer the Control Data 6600, Scott, Foresman and Company, 1970.

Tomita, Shinji, Kiyoshi Shibayama, Toshiaki and Hiroshi Hagiwara, *Performance Evaluation and Improvement of a Dynamically Microprogrammable Computer with Low–Level Parallelism*, Kyoto University, 1980.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentablity of claims 1–25 is confirmed.

New claims 26 and 27 are added and determined to be patentable.

26. *In an instruction processing apparatus, a system for using multiple sets of condition values within a single context, the system comprising:*
   *an opcode storage configured to buffer a plurality of opcodes corresponding to at least some of said instructions to be processed from said context, wherein said opcode storage comprises a processor instruction queue, said queue configured to buffer instructions waiting to be executed and to track the execution status of instructions that are issued;*
   *a first circuit coupled to said opcode storage, said first circuit configured to receive opcodes of a first type of instruction and addresses for storing sets of at least one condition value, and to generate for each said opcode of said first type a set of at least one condition value associated with one of the addresses;*
   *a condition storage coupled to said first circuit, said condition storage configured to store a plurality of said sets of condition values at storage locations based upon addresses received from the first circuit;*
   *a second circuit coupled to said opcode storage, said second circuit configured to receive opcodes of a second type of instruction and condition storage addresses, and to generate a set of at least one output value, said output value for each said second type of instruction depending on a particular one of said stored sets of condition values associated with the condition storage address; and*
   *an access circuit coupled between said condition storage and said second circuit, said access circuit configured to access by the condition storage address said particular one of said stored sets of condition values for each said opcode of said second type.*

27. *In an instruction processing apparatus, a system for using multiple sets of condition values within a single context, the system comprising:*
   *an opcode storage configured to buffer a plurality of opcodes corresponding to at least some of said instructions to be processed from said context;*
   *a first circuit coupled to said opcode storage, said first circuit configured to receive opcodes of a first type of instruction and addresses for storing sets of at least one condition value, and to generate for each said opcode of said first type a set of at least one condition value associated with one of the addresses;*
   *a condition storage coupled to said first circuit, said condition storage configured to store a plurality of said sets of condition values at storage locations based upon addresses received from the first circuit;*
   *a second circuit coupled to said opcode storage, said second circuit configured to receive opcodes of a second type of instruction and condition storage addresses, and to generate a set of at least one output value, said output value for each said second type of instruction depending on a particular one of said stored sets of condition values associated with the condition storage address; and*
   *an access circuit coupled between said condition storage and said second circuit, said access circuit configured to access by the condition storage address said particular one of said stored sets of condition values for each said opcode of said second type,*
   *wherein said sets of condition valve are stored as condition codes, each said condition code comprising a plurality of flag bits.*

\* \* \* \* \*